United States Patent
Doshi et al.

(10) Patent No.: US 6,215,763 B1
(45) Date of Patent: Apr. 10, 2001

(54) MULTI-PHASE PROCESS FOR DISTRIBUTED PRECOMPUTATION OF NETWORK SIGNAL PATHS

(75) Inventors: Bharat Tarachand Doshi, Holmdel; Subrahmanyam Dravida, Freehold; Paramasiviah Harshavardhana, Marlboro; Yufei Wang, Tinton Falls, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/960,463

(22) Filed: Oct. 29, 1997

(51) Int. Cl.$^7$ .................................................. G01R 31/08
(52) U.S. Cl. ............................................ 370/216; 370/221
(58) Field of Search ............................. 370/216, 16, 221, 370/228, 217, 222, 244, 224, 468, 465, 252; 395/182.02, 575; 714/1, 2, 3, 4, 7, 8; 340/617, 618

(56) References Cited

U.S. PATENT DOCUMENTS

| | | |
|---|---|---|
| 4,956,835 | 9/1990 | Grover . |
| 5,093,824 | 3/1992 | Coan et al. . |
| 5,435,003 | 7/1995 | Chng et al. . |
| 5,495,471 * | 2/1996 | Chow et al. ........................... 370/16 |
| 5,537,532 | 7/1996 | Chng et al. . |
| 5,581,689 | 12/1996 | Slominski et al. . |
| 5,646,936 | 7/1997 | Shah et al. . |
| 5,657,439 * | 8/1997 | Jones et al. ............................... 714/7 |
| 5,835,482 | 11/1998 | Allen . |
| 5,914,798 * | 6/1999 | Liu ....................................... 370/221 |

OTHER PUBLICATIONS

J. Anderson, B.T. Doshi, S. Dravida and P. Harshavardhana, "Fast Restoration of ATM Networks," IEEE Journal on Selected Areas in Communications, vol. 12, No. 1, pp. 128–138, Jan. 1994.

W.D. Grover, "The Self–Healing Network: A Fast Distributed Restoration Technique for Networks Using Digital Cross Connect Machines," IEEE Globecom '87, pp. 1090–1095.

C.H. Yang et al., "Fitness: Failure Immunization Technology for Network Service Survivability," IEEE Globecom '88, pp. 1549–1554.

(List continued on next page.)

Primary Examiner—Wellington Chin
Assistant Examiner—Prenell Jones
(74) Attorney, Agent, or Firm—Ryan, Mason & Lewis, LLP

(57) ABSTRACT

Distributed precomputation techniques for determining primary and/or restoration paths in an optical or electrical network. The invention provides a number of partially and fully asynchronous distributed precomputation algorithms which may be implemented, for example, by the nodes of an all-optical network, in which network links are constrained in terms of optical signal wavelength and failure isolation. A given distributed precomputation algorithm may include a first phase in which paths are allocated for capacity demands to the extent possible without resolving contentions, and a second phase in which contentions between demands for the same capacity are resolved. The first phase may implement a contention locking mechanism which locks a primary path of a given demand to prevent other demands from contending for the same capacity, and a link capacity control mechanism which involves storing a link status table at one or more nodes, the link status table listing a number of specific failures and demands which are affected by the failures. The second phase of the distributed precomputation algorithm reroutes paths previously allocated to one or more demands in order to free up capacity required for another demand, so as to optimize overall network capacity utilization.

17 Claims, 24 Drawing Sheets

OTHER PUBLICATIONS

C. Edward Chow, J. Bicknell, S. McCaughey and S. Syed, "A Fast Distributed Network Restoration Algorithm," IEEE Globecom '93, pp. 261–267, 1993.

S. Hasegawa, Y. Okanone, T. Egawa and H. Sakauchi, "Control Algorithms of SONET Integrated Self–Healing Networks," IEEE Journal on Selected Areas in Communications, vol. 12, No. 1, pp. 110–119, Jan. 1994.

W.D. Grover, T.D. Bilodeau and B.D. Venables, "Near Optimal Spare Capacity Planning in a Mesh Restorable Network," IEEE Globecom '91, pp. 2007–2012.

H. Komine et al., A Distributed Restoration Algorithm for Multiple–Link and Node Failures of Transport Networks, IEEE Globecom '90, pp. 459–463.

* cited by examiner

MULTI-PHASE PROCESS FOR DISTRIBUTED PRECOMPUTATION OF NETWORK SIGNAL PATHS

RELATED APPLICATIONS

The present application is related to co-pending U.S. Patent Applications entitled: "Distributed Precomputation of Signal Paths in an Optical Network," U.S. Ser. No. 08/960, 462; "Distributed Precomputation of Network Signal Paths with Improved Performance Through Parallelization," U.S. Ser. No.08/959,809; "Distributed Precomputation of Network Signal Paths with Table-Based Link Capacity Control," U.S. Ser. No. 08/960,569; and "Hybrid Centralized/Distributed Precomputation of Network Signal Paths," U.S. Ser. No.08/959,800; each filed concurrently herewith in the names of inventors Bharat T. Doshi, Subrahmanyam Dravida, P. Harshavardhana and Yufei Wang, and assigned to the assignee of the present application.

FIELD OF THE INVENTION

The present invention relates generally to techniques for restoring communication in a network after a failure in a link, span or node of the network, and more particularly to restoration techniques in which restoration paths are precomputed at nodes distributed throughout the network.

BACKGROUND OF THE INVENTION

All-optical networks using wavelength division multiplexing (WDM) are increasingly being deployed for a wide variety of communication applications. WDM techniques allow optical signals having different wavelengths to be multiplexed into a single optical fiber. Current WDM deployments allow multiplexing of up to about 16 different wavelengths on a single fiber, but systems multiplexing 32 or more different wavelengths on a single fiber are expected to become available soon. Each of the wavelengths serves as an optical carrier and can be used independently of the other wavelengths, such that different wavelengths may use different modulation formats to carry different signal types. In a simple example, each wavelength may carry a modulation signal representing a synchronous optical network/ synchronous digital hierarchy (SONET/SDH) client payload, where each client is a SONET-rate TDM application and the common carried signals are in an OC-48 or an OC-192 format.

FIG. 1 shows a conventional optical routing device 10 which includes a wavelength selecting cross-connect (WSCC) 12, two input optical fibers 14-1, 14-2 and two output optical fibers 14-3, 14-4. The routing device 10 in this embodiment is configured to route incoming optical signals at wavelengths $\lambda_1$ and $\lambda_2$ on fiber 14-1 to output fibers 14-4 and 14-3, respectively, and to route incoming optical signals at wavelengths $\lambda_1'$ and $\lambda_2'$ on fiber 14-2 to output fibers 14-4 and 14-3, respectively. The WSCC 12 thus serves to cross-connect incoming wavelengths on a given input fiber to different output fibers, but does not provide any transformation in wavelength. When only this type of routing device is present in an optical network, the network typically routes a given end-to-end demand using a single wavelength. If a primary network path assigned to the given demand fails, the demand generally must be carried on a secondary or restoration path using exactly the same wavelength as the primary path.

FIG. 2 illustrates an optical network 20 in which wavelength transformations may be provided for signals traversing the network, but only at the interface between a client and the optical network. A first client equipment (CE) device 18-1 communicates with a second CE device 18-2. The first CE device 18-1 uses wavelength $\lambda_1$ and the second CE device uses wavelength $\lambda_3$. The first CE 18-1 transmits a signal at $\lambda_1$ to a wavelength adapter 22 which maps the incoming wavelength $\lambda_1$ to an outgoing wavelength $\lambda_2$. A wavelength adapter (WA) is a device which allows conversion of wavelength at the client-network interface. The wavelength $\lambda_2$ is used to carry the modulation signal of CE 18-1 from an access node 24 of network 20 to an egress node 26 of network 20. The egress node 26 delivers the $\lambda_2$ signal to a second WA 28 which maps the wavelength $\lambda_2$ to wavelength $\lambda_3$ for transmission to the second CE 18-2. In the event of a failure in the primary path through optical network 20 from CE 18-1 to CE 18-2, a secondary or restoration path with a different wavelength, such as $\lambda_4$, may be used to transport the customer demand through the network 20. Other types of optical network elements combine features of the WSCC 12 of FIG. 1 and the WAs 22, 28 of FIG. 2. For example, a wavelength interchange device may be used to cross-connect incoming wavelengths onto different output fibers while also providing transformation of wavelengths. Such devices are called wavelength interchanging cross-connects (WICCs).

An important issue in the design of large-scale optical networks including WSCCs, WAs, WICCs and other optical signal routing devices relates to traffic restoration in the event of a failure in a link, span or node. A simplistic approach to restoration in an optical network is to provide complete redundancy, such that the network includes a dedicated back-up or secondary connection for each primary connection of the network. When a link, span or node of the primary connection fails, traffic may then be switched onto the corresponding elements of the secondary connection. Unfortunately, this approach uses a large amount of restoration capacity and therefore may be undesirable in many networks. More sophisticated approaches involve the use of a path restoration algorithm to provide automatic restoration of network traffic in the event of a primary path failure, while sharing restoration capacities whenever possible.

It should be noted that large-scale optical networks typically include a large number of spans, and two different point-to-point links may share a common span section. FIG. 3 illustrates a shared span section in a portion of a network including nodes A, B and C. The dotted lines AC and AB represent two distinct optical links. The physical layout, shown by solid lines, is such that both of these links share the span AS. If this span fails due to a fiber cut or other problem, then both the links AC and AB will fail. Thus a demand using link AB on its primary path cannot be restored on a route using link AC. It is therefore important that a given restoration algorithm achieve restoration of network traffic in the event of span failures as well as link failures, by providing distinct spans and links for the restoration path. Furthermore, to decrease vulnerability of the network to node failures, it is also desirable to perform automatic restoration in the event of single node failures. Thus the overall goal of an effective restoration algorithm should be to perform automatic restoration in the event of single link, span or node failures. The term "automatic" connotes restoration by control computers in the network, rather than by manual intervention, thus permitting fast restoration.

FIG. 4 shows a portion of a network including nodes A, B, C and D providing a bidirectional path at a wavelength $\lambda_1$ between a first CE 18-1 and a second CE 18-2. In simple optical networks, failures are generally discovered through signal strength measurements, which may be collected for each individual wavelength at each node of the network. If a link failure occurs between nodes B and C as shown in FIG. 4, the bidirectional nature of the path allows each of the nodes A, B, C and D to detect a loss of signal (LOS) condition, but, with only the LOS information, none of these nodes will know the exact location of the failure. As a result, local restoration around the failed link, by the nodes connecting the failed link, is generally not possible, assuming that the optical network under consideration does not employ any other mechanism to isolate failures. This inability to determine the exact location of the failure from LOS information also requires that the restoration path be disjoint from the primary path. Depending on whether a network includes WSCCs, WAs or WICCs, additional restrictions may be imposed on the restoration and primary paths of a demand. The network path of FIG. 4 includes only WSCCs, and the secondary or restoration path therefore must have the same wavelength as the primary path. As previously noted, more complex networks such as the network of FIG. 2 also include WAs, such that the restoration path could have a different wavelength than the primary path, although the same wavelength generally must be used from an access node such as node 24 of FIG. 2 to an egress node such as node 26. FIG. 5 shows a more general situation in which nodes A, B, C and D between source CE 18-1 and destination CE 18-2 each include WICCs. The FIG. 5 network thus permits local wavelength transformations at each node, such that the path from the access node A to the egress node D need not be at a single wavelength.

Path restoration techniques may be classified in many dimensions. A first classification is based on where the paths are computed. In that sense, the restoration computation may be either centralized or distributed. In the former, the restoration path computation is done at a central controller which has global information regarding the network. In distributed restoration, each node computes the restoration paths for demands passing through that node. Another classification of path restoration techniques depends on where the restoration action is implemented. In particular, the restoration may be local, end-to-end path based or hybrid. In local restoration, the nodes closest to the point of failure initiate restoration action for all demands affected by a given failure. In end-to-end path based restoration, the source-destination node pairs of demands affected by a given failure initiate the restoration action. Hybrid restoration approaches have aspects of both local and end-to-end path-based restoration in that they seek to find the best restoration path, in terms of minimizing the required spare capacity, that is closest to the point of failure.

Restoration techniques may also be differentiated by the time at which the restoration paths are computed. Discovery-based approaches determine restoration paths after a failure event has occurred, while precomputed approaches determine restoration paths before the failure event and the failure event merely triggers the activation of the precomputed paths. Discovery-based approaches may be centralized or distributed, but their defining characteristic is that they compute restoration paths in real time, after the failure occurs. Centralized discovery-based approaches use some mechanism (e.g., alarms) such that the network elements detecting failures can communicate to the central controller, which then computes the best available paths. In the distributed discovery-based approach, as soon as a failure event occurs, the nodes affected by the failure need to find out where spare capacity is available, and to create restoration paths by reserving available spare capacity on selected paths. If two requests contend for the same spare capacity, then some form of contention-resolution procedure is needed to resolve the contention. The capacity search procedure, including contention resolution, is performed after the failure but before the demands affected by a failure can be rerouted. As a result, for distributed discovery-based restoration, the restoration times tend to be large and/or the spare capacity utilization is poor. Moreover, many of the constraints imposed by optical networks do not allow implementation of simple distributed discovery-based approaches to restoration.

A prior art centralized precomputation technique is described in J. Anderson, B. T. Doshi, S. Dravida and P. Harshavardhana, "Fast Restoration of ATM Networks," JSAC 1991, which is incorporated by reference herein. In centralized precomputation, a central controller in the network stores information on the entire network topology as well as capacities of all links in the network. This controller runs an optimization algorithm with the objective of computing alternate paths for every possible failure in the network while utilizing minimum redundant capacity, and routing tables specifying these alternate paths are downloaded to the appropriate network elements. When a failure is detected by a network element, it activates the corresponding alternate routing table. Similar action is taken by all the network elements as and when the elements receive the failure information. A drawback of this approach is that it requires a central controller of substantial computing capacity and may therefore be hard to implement as the network increases in size.

A prior art distributed discovery-based computation technique is described in W. D. Grover, "The Self-Healing Network: A Fast Distributed Restoration Technique for Networks Using Digital Cross Connect Machines," IEEE Globecom 1987, and U.S. Pat. No. 4,956,835, issued to W. D. Grover on Sep. 11, 1990, both of which are incorporated by reference herein. In this approach, when a link failure is discovered, the nodes at the two ends of the failed link initiate a search for spare capacity in the network on links that are potential candidates for alternate routing. The available spare capacity is then allocated on a first-come-first-served basis by one of the nodes to which the failed link is attached. This approach suffers from a number of significant drawbacks, especially under the constraints likely to be present in typical conventional optical networks. First, the discovery of spare capacity after failure introduces at least a round-trip delay between nodes, thereby increasing restoration time. Second, even if sufficient spare capacity is available to restore all traffic affected by the failure, the fact that capacity is allocated on a first-come-first-served basis may not allow full restoration in practice. Third, these and most other distributed discovery-based techniques are fundamentally intended for restoration of single link failures in networks in which the location of the failure can be identified. This is because the node at one end of the failed link initiates capacity discovery. Since typical conventional optical networks do not have failure isolation capability, the distributed discovery-based approach will not work for such networks. Finally, the distributed discovery-based approach exemplified in the above-cited Grover references does not work well for node failures. In the case of a node failure, the burden of discovering spare capacity falls on multiple nodes, not just the nodes on the two ends of the failed link. The Grover approach generally cannot be used by multiple nodes simultaneously.

Variants of the Grover approach are described in C. H. Yang et al., "FITNESS: Failure Immunization Technology for Network Service Survivability," IEEE Globecom 1988, and C. Edward Chow, J. Bicknell, S. McCaughey and S. Syed, "A Fast Distributed Network Restoration Algorithm," IEEE Globecom '93, pp. 261–267, 1993, and S. Hasegawa, Y. Okanone, T. Egawa and H. Sakauchi, "Control Algorithms of SONET Integrated Self-Healing Networks." Unfortunately, none of these variants overcome the fundamental deficiencies of the discovery-based Grover approach. Generally, simultaneous attempts by multiple nodes to discover and reserve restoration capacity require multiple message exchanges, contention resolution and path calculation, and the variants are thus unable to avoid excessive restoration delays.

There is presently no end-to-end path restoration approach which provides a distributed precomputation technique suitable for use in an optical network. Although a distributed precomputation technique is described in U.S. Pat. Nos. 5,435,003 and 5,537,532, both entitled "Restoration in Communications Networks" and issued to R. S. K. Chng, C. P. Botham and M. C. Sinclair, this distributed precomputation technique is not well-suited for use in an optical network which includes WSCCs, WAs, WICCs or other typical optical routers such as those described in conjunction with FIGS. 1, 2, 4 and 5 above. The technique precomputes alternate paths for certain failure scenarios. After a failure occurs, a pair of end nodes affected by the failure attempt to find alternate paths in real-time. If a precomputed restoration path exists, the end nodes switch traffic to the precomputed path while the real-time paths are being computed. Once the best real-time path is computed, if the end nodes determine that the real-time path is better than the precomputed path, they switch traffic to the real-time path. This technique suffers from a number of drawbacks which render it of limited utility in an optical network. For example, the technique fails to address the possibility that a path computed in real-time for one failure scenario may overlap with precomputed paths for another scenario. Also, a path computed for one demand in real time may overlap with a precomputed path for another demand. There is no procedure for resolving conflicts between demands contending for restoration capacity on the same link, either during precomputation or during real-time computation. In addition, the technique does not support the use of failure-disjoint alternate paths for situation s in which fault isolation is not possible. Moreover, the technique provides no resource optimization other than that of picking the best path among a set of ad hoc paths. These and other deficiencies of the approach of U.S. Pat. Nos. 5,435,003 and 5,537,532 render it of limited value in a complex, large-scale optical network. The prior art thus fails to provide a distributed precomputation restoration approach which provides acceptable performance in a large-scale optical network.

It is therefore apparent that a need exists for improved network restoration techniques which utilize distributed precomputation to provide path restoration in large-scale optical networks after link, span or node failures, while avoiding the problems associated with the above-described conventional restoration techniques.

SUMMARY OF THE INVENTION

The present invention provides techniques for performing distributed precomputed restoration in a large-scale optical or electrical network. In accordance with a first aspect of the invention, a distributed precomputation algorithm is provided which is suitable for implementation by the nodes of an all-optical network. The precomputation of primary and restoration paths may be performed at the source or destination nodes of a demand in an optical network in which links are constrained in terms of the particular optical signal wavelengths which may be carried thereon, and in which failures cannot be isolated using an automatic failure detection capability. These factors have heretofore prevented the use of conventional distributed precomputation techniques in optical networks. The distributed precomputation algorithms of the present invention may be used to determine a restoration path for a given demand under network capacity constraints, such that the restoration path may be used to satisfy the demand in the event of a failure on a primary path of the demand. The algorithm may also be used to determine only the primary path for the demand, or both the primary and restoration paths for the demand. Various embodiments of the distributed precomputation algorithm may be configured to be partially or fully asynchronous.

In accordance with a second aspect of the invention, the distributed precomputation algorithm utilizes at least one parallelization mechanism so as to improve the efficiency of the algorithm. For example, the parallelization mechanism may provide contention resolution among one or more contending demands. The contention resolution may be based on locking the primary path associated with a given demand, or may be based on a set partitioning approach. Another parallelization mechanism may involve processing the demands in an order which has been predetermined to improve a path search operation of the distributed precomputation algorithm.

In accordance with a third aspect of the invention, the distributed precomputation algorithm may include a first phase in which link capacity is allocated to demands to the extent possible without violating capacity constraints, and a second phase in which contentions between demands for the same capacity are resolved. The first phase may include a contention locking mechanism which locks a primary path of a given capacity demand to prevent other demands from contending for the same capacity. The second phase of the distributed precomputation algorithm may optimize the use of network capacity by rerouting paths previously allocated to one or more demands in order to free up capacity required for another demand.

In accordance with a fourth aspect of the invention, a link capacity control feature may be provided in a distributed precomputation algorithm by storing a link status table at one or more nodes controlling a given one of the links. The link status table identifies a number of specific failures and demands currently routed through the link which are affected by the failures. The table may also provide, for one or more of the specific failures, an indication of the spare capacity available on the link.

In accordance with a fifth aspect of the invention, a hybrid centralized/distributed approach is provided in which certain information used in distributed precomputation is downloaded from a central controller of the network. The downloaded information is used as an input to a distributed precomputation algorithm implemented by the network nodes in order to provide improved performance. The central controller makes use of its knowledge of global network topology in computing the information to be downloaded to the nodes. The downloaded information generally represents network information which changes with less frequency than other network information processed by the nodes as part of the distributed precomputation algorithm. The information downloaded from the central controller may include, for example, network connectivity information regarding interconnection between the network nodes in the absence of failures, capacities for at least a subset of the links in the network, a subset of all possible routes between a source node and a destination node in the network arranged in an appropriate initial search order, a link contention index for each of the links in the network, wherein the contention index for a given link is indicative of a total number of paths which include the given link, and indices assigned to one or more of the nodes and links of the network, wherein the indices are used by the distributed precomputation algorithm to determine an order of processing operations involving the one or more nodes and links of the network. Other types of centrally computed information may also be downloaded to the nodes for use in a distributed precomputation algorithm in accordance with the invention.

The distributed precomputation techniques of the present invention are well-suited for use in complex optical networks which include wavelength select devices, wavelength adapters, wavelength interchange devices and other types of optical routers. The techniques may be used to precompute restoration paths in a distributed manner, such that the restoration time is significantly reduced. The techniques are capable of operating in a failure-independent manner, and can therefore accommodate situations in which failure isolation is not possible, while also utilizing failure isolation information to do failure-dependent alternate routing when such information is available. The techniques make more efficient use of spare capacity than the conventional techniques described above, through the use of the above-noted link capacity control mechanism and path optimization procedure. In addition, the link-level information storage and inter-nodal message exchange constructs of the invention provide a graceful transition to a real-time discovery-based approach for failure scenarios that are outside the scope of precomputed restoration. These and other features and advantages of the present invention will become more apparent from the accompanying drawings and the following detailed description.

DETAILED DESCRIPTION OF THE INVENTION

Figure 1:
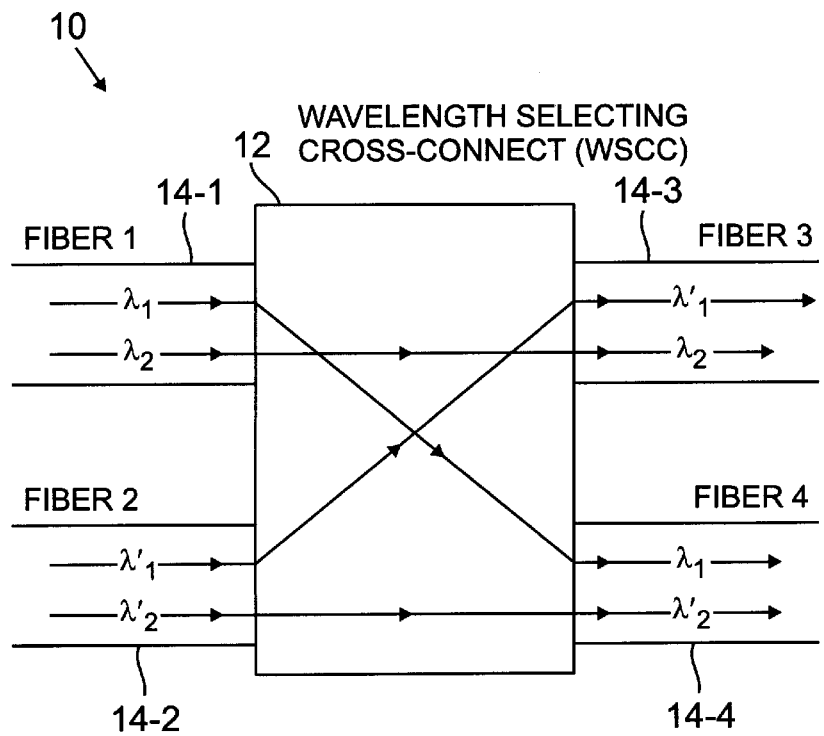
FIG. 1 illustrates wavelength routing using a wavelength select cross-connect (WSCC).
Figure 2:
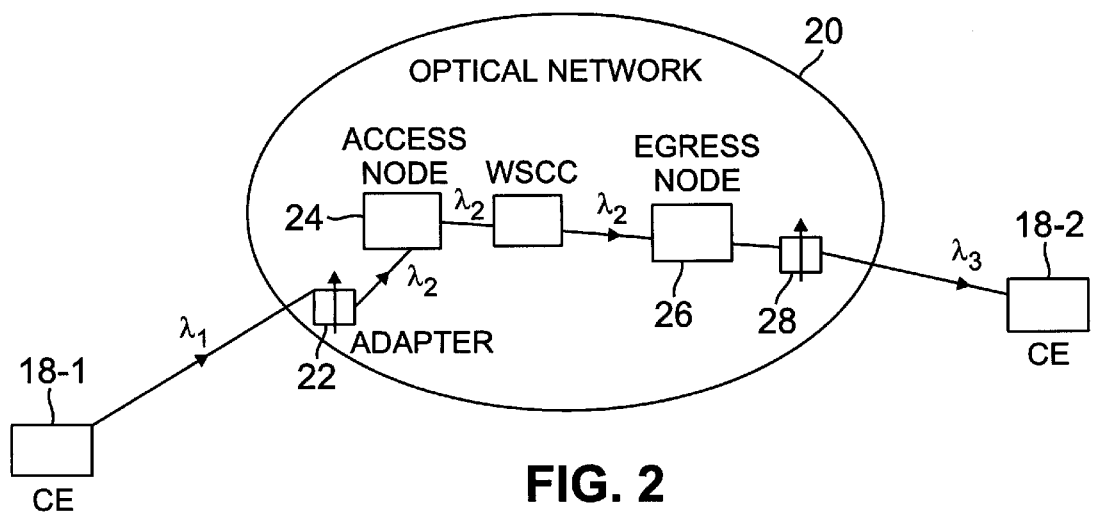
FIG. 2 illustrates one type of wavelength routing in an optical network.
Figure 3:
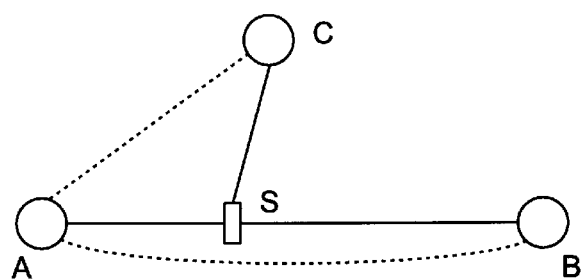
FIG. 3 illustrates a pair of optical links sharing a common span.
Figure 4:
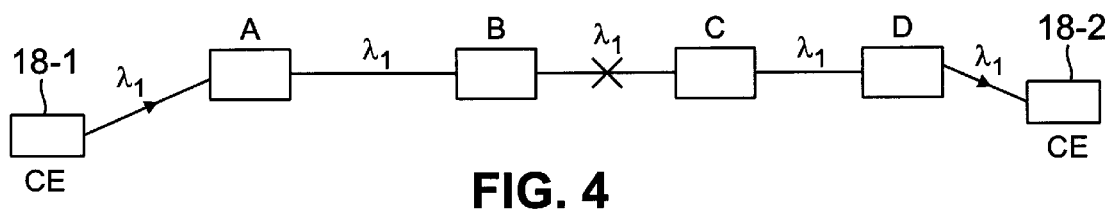
FIGS. 4 and 5 illustrate alternative wavelength routing techniques.

The invention will be described below in several sections in accordance with the following outline.
1. Exemplary Network and Node Configurations
2. A Partially Asynchronous Distributed Precomputation Algorithm
3. A Fully Asynchronous Distributed Precomputation Algorithm
4. Alternative Contention Resolution Based on Set Partitioning
5. A Distributed Precomputation Algorithm Using Probe and Request Messages
6. Hybrid Centralized/Distributed Precomputation The invention will be illustrated in conjunction with an exemplary optical network. It should be understood, however, that the invention is not limited to use with any particular type of network, but is instead more generally applicable to any network in which it is desirable to provide improved restoration. For example, the distributed precomputation restoration techniques may be utilized in telephone, cable and other electrical networks. The term "network" as used herein is therefore intended to include not only optical networks, but also electrical networks and hybrid optical-electrical networks. The term "distributed" refers generally to computation which occurs at multiple nodes of a network, rather than in a central controller or other single centralized location. The term "precomputed" refers to computation which occurs prior to or substantially contemporaneously with a link, span or node failure, as opposed to in response to an indication of the failure.

The path restoration techniques of the present invention can provide substantial advantages in a number of different applications. For example, the invention may be used in an application in which a network of given capacity is deployed in the field and it is desired to restore the maximum amount of traffic given the limitations of existing capacity in the network. The invention is also suitable for use in applications in which, in addition to making the best use of existing capacity, it is desirable to compute the minimum amount of additional capacity necessary to provide 100% restoration of traffic in the event of single link, span or node failure, and to determine the links on which this additional capacity is needed. For example, an illustrative embodiment of the invention may take an aggressive approach of striving for high survivability performance characterized by as short a restoration time as possible, in the range of hundreds of milliseconds, while achieving a high network efficiency. It is recognized that not all applications demand a uniformly rigorous restoration time of a few hundred milliseconds. Some applications, such as voice transmission, may be more tolerant than other applications, such as distributed computing. The invention provides sufficient flexibility to accommodate these and other diverse network applications.

For simplicity of illustration, the path restoration techniques will be described herein assuming directionality from source to destination nodes as if capacity allocation is also directional. However, demands are generally full duplex and the capacity of a given link is typically controlled by the two nodes at the ends of the link. The node closer to the source of a capacity request usually makes the decision, but the other node needs to update its information on available capacity. In order to make the simplified description correspond to full duplex capacity allocation, the following description may refer to decision making links. In reality, decisions are made by nodes, not links. When the following description refers to a decision by a link, it therefore implies that the node at the end of the link closest to the source of message makes the decision, and the node at the other end of this link updates its information to reflect that decision. When the following description refers to a message passing from one link to the next, it implies a message within the node from a portion of the node controlling one link passing to a portion of the same node controlling the next link. It will therefore be readily apparent to those skilled in the art that the described techniques may be easily extended to cover typical full duplex applications.

1. Exemplary Network and Node Configurations

Figure 6:
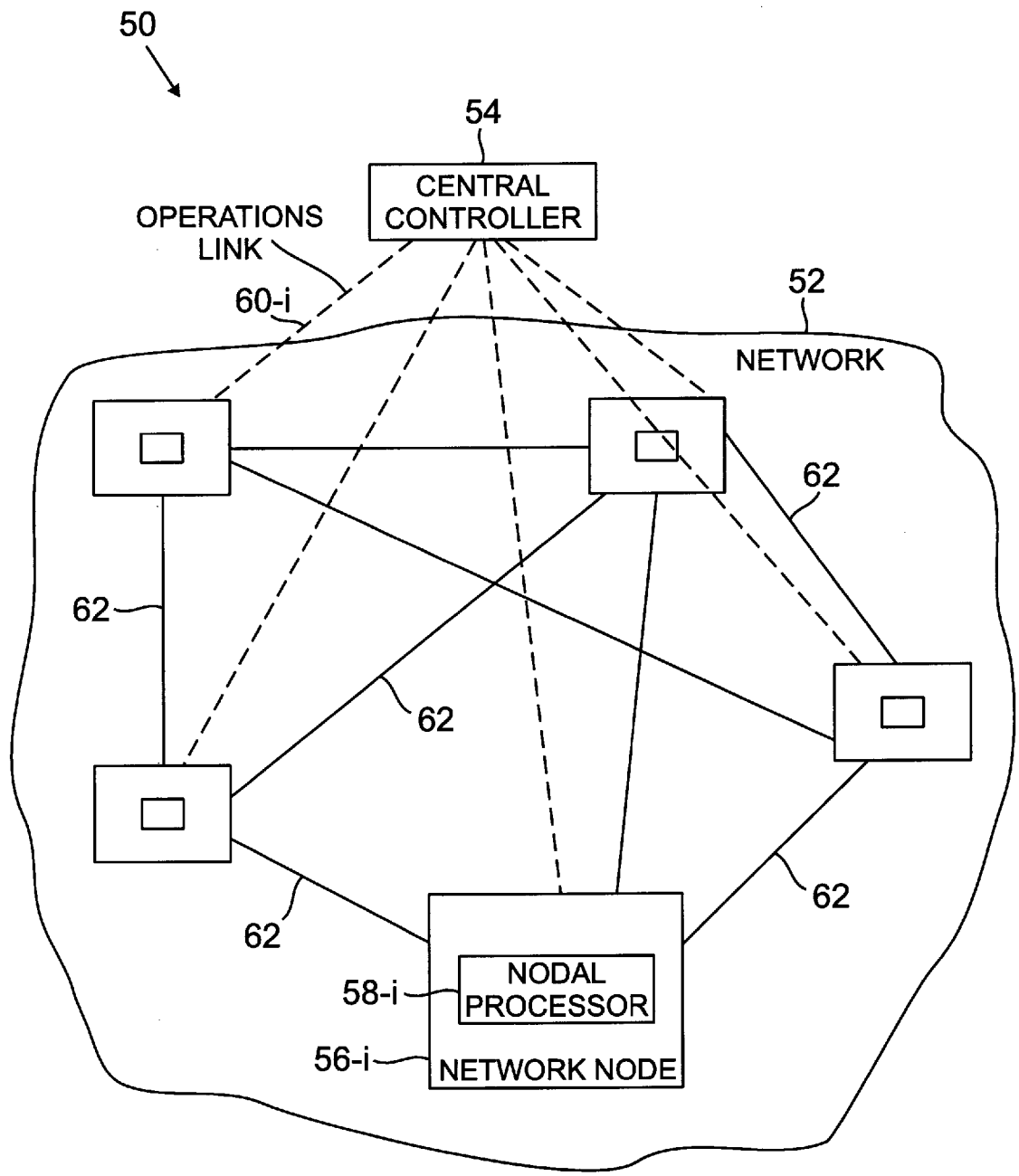
FIG. 6 shows an optical network in which the distributed precomputation techniques of the present invention may be implemented.

FIG. 6 shows an exemplary optical system 50 in which the distributed precomputation restoration techniques of the present invention may be implemented. The system 50 includes an optical network 52 and a central controller 54. The network 52 includes a number of nodes 56-$i$, i=1, 2, . . . N. Each of the nodes 56-$i$ includes a corresponding nodal processor 58-$i$. The nodes 56-$i$ of network 52 are interconnected by optical fiber connections 62. In this example, each of the nodes 56-$i$ has a fiber connection to three other nodes. Each of the nodes 56-$i$ is also connected to the central controller 54 via a corresponding operations link 60-$i$, shown as a dashed line in FIG. 6. The central controller 54 and nodes 56-$i$ may each represent a mainframe computer, a workstation, a microcomputer, a personal computer or other suitable digital data processor programmed to provide the path restoration techniques described herein. It should be noted that the system of FIG. 6 is simplified for purposes of illustration. The invention is well-suited for use in large-scale regional, national and international networks which may include many subnetworks, each having hundreds of nodes. In an optical network for routing telephone calls, one or more of the subnetworks may be associated with each local exchange carrier (LEC) and inter-exchange carrier (IXC) of the network. The central controller 54 may or may not participate in network restoration, depending upon the restoration technique employed. For example, the hybrid approach described herein will utilize the central controller 54, whereas the other illustrative restoration techniques described herein generally do not.

Figure 7:
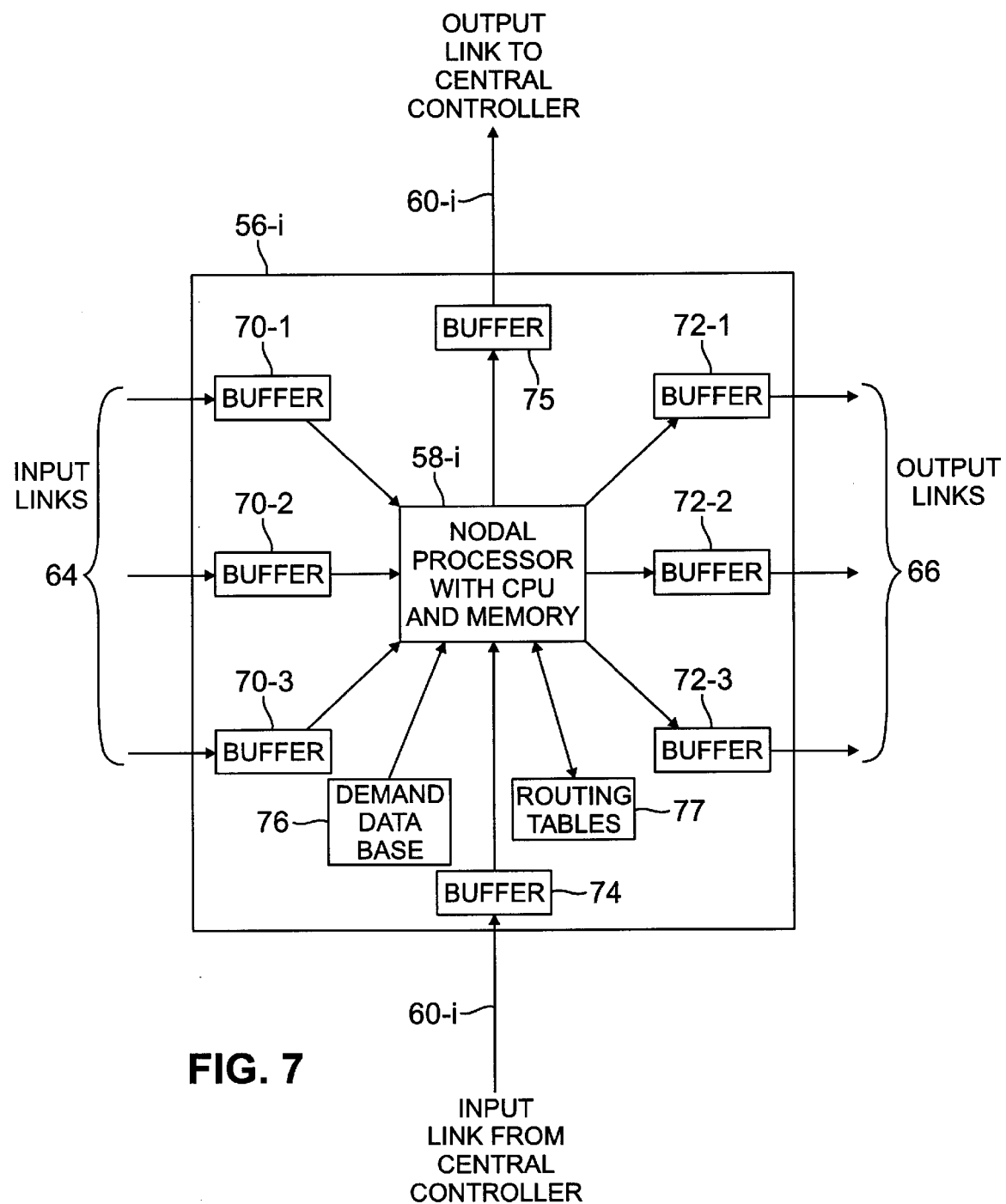
FIG. 7 is a more detailed diagram of a node in the exemplary network of FIG. 6.

FIG. 7 shows one of the nodes 56-$i$ of network 52 in greater detail. The node 56-$i$ includes a nodal processor 58-$i$ which includes a central processing unit (CPU) with memory. A set of input links 64, corresponding to fiber connections 62 with three other nodes, are connected to buffers 70-1, 70-2 and 70-3 in node 56-$i$. The node 56-$i$ supplies signals to three other nodes via a set of output links 66 also corresponding to fiber connections 62. The output links 66 are connected to buffers 72-1, 72-2 or 72-3. The buffers 70-1, 70-2 and 70-3 may provide optical-to-electrical for signals received on input links 64, while the buffers 72-1, 72-2 and 72-3 may provide electrical-to-optical conversion for signals to be transmitted on output links 66. The operational link 60-$i$ of node 56-$i$ to the central controller 54 includes an input operational link which is coupled to nodal processor 58-$i$ via an input buffer 74, and an output operational link which receives signals from nodal processor 58-$i$ via an output buffer 75. The node 56-$i$ also includes a demand database 76 for storing demands for network capacity, and a set of routing tables which specify routing paths through the network for particular demands. The demand database 76 and routing tables 77 may be components of a common memory within node 56-$i$, and may be combined with or otherwise associated with the memory of nodal processor 58-$i$. The node 56-$i$ has been simplified for purposes of illustration, and as noted above may include a substantially larger number of input and output links, as required for a given application.

2. A Partially Asynchronous Distributed Precomputation Algorithm

Figure 8:
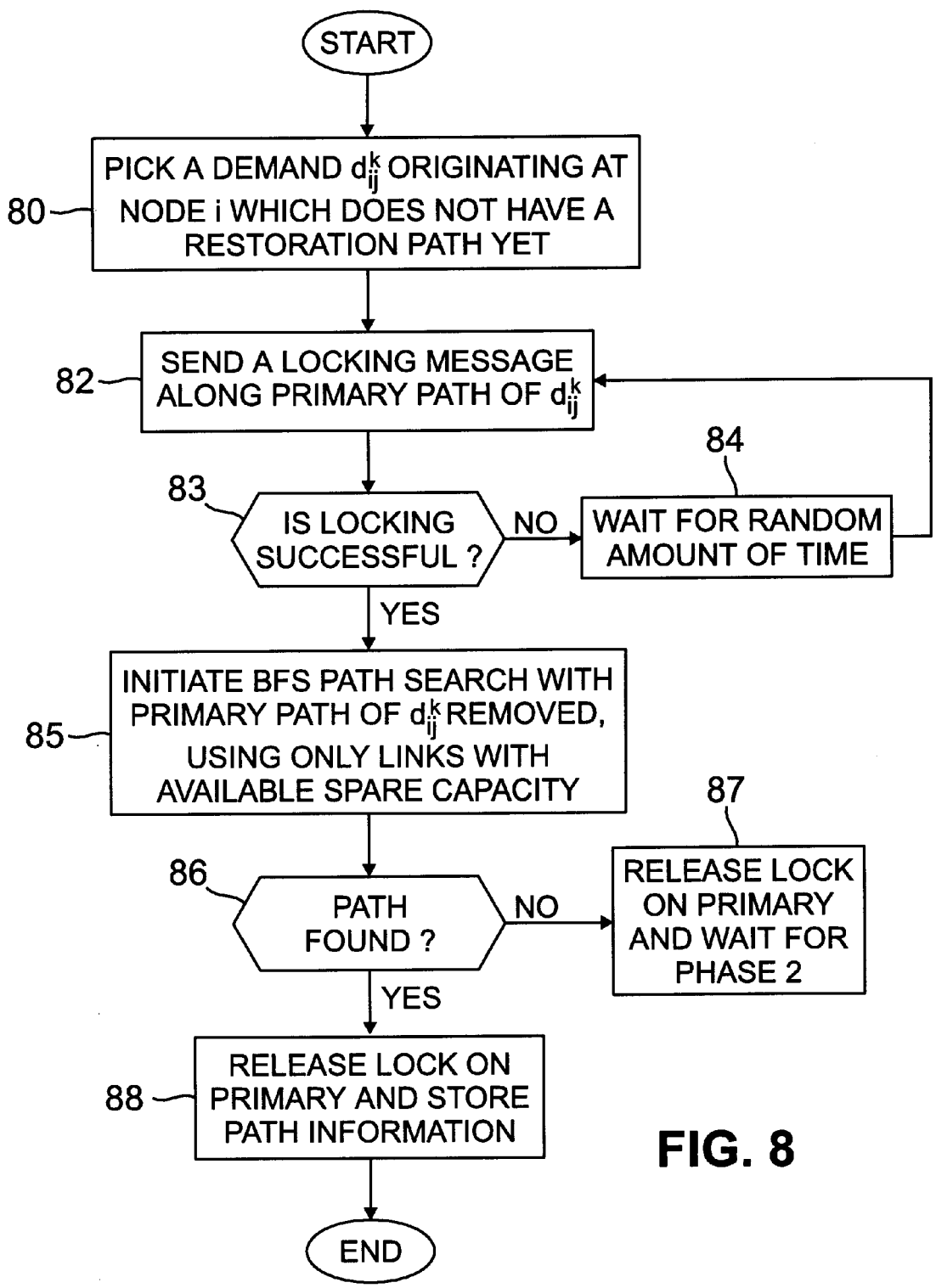
FIG. 8 is a flow diagram illustrating the operation of a first phase of a distributed precomputation algorithm in accordance with the invention.
Figure 9A:
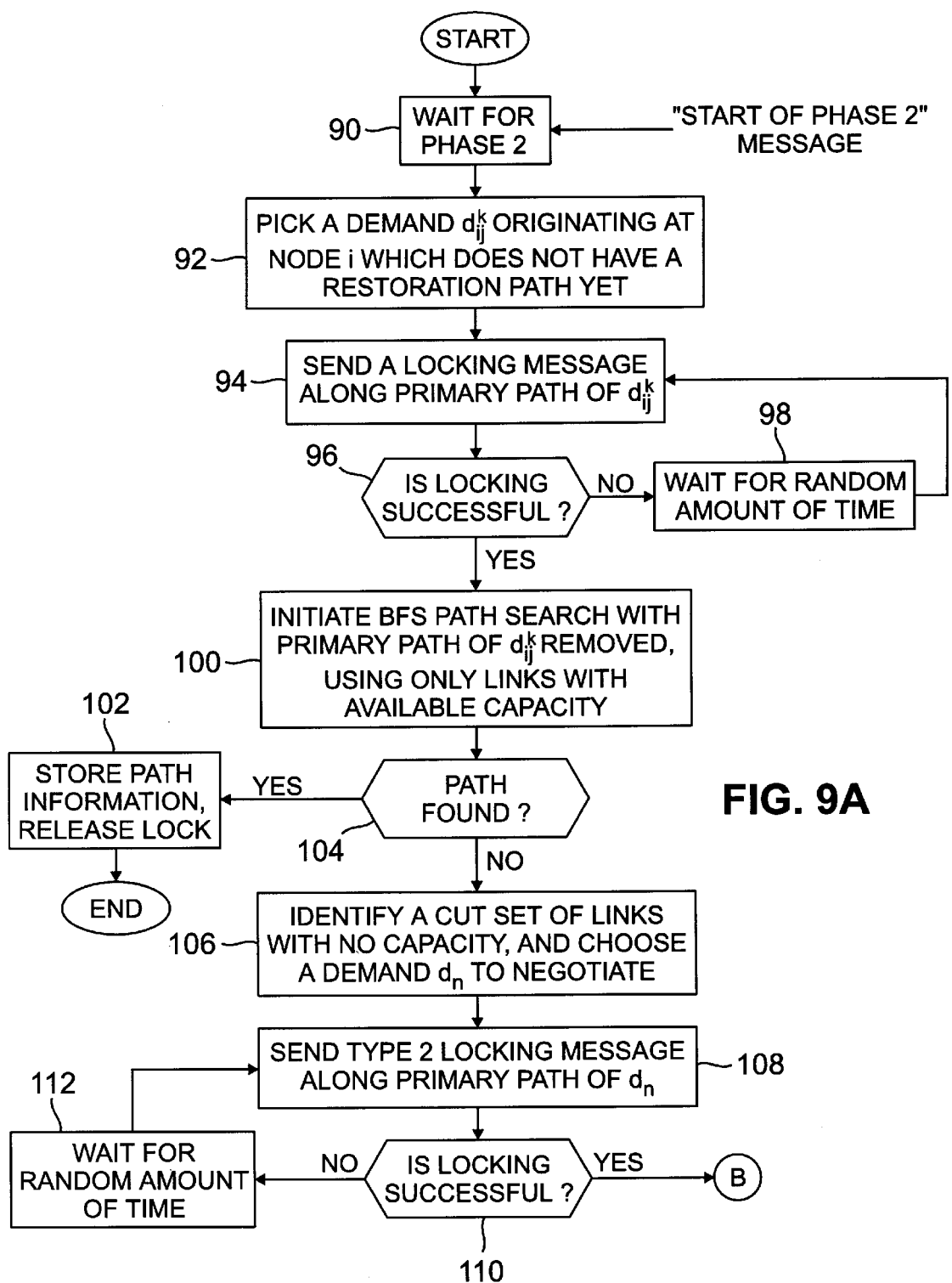
FIGS. 9A and 9B are flow diagrams illustrating the operation of a second phase of a distributed precomputation algorithm in accordance with the invention.
Figure 9B:
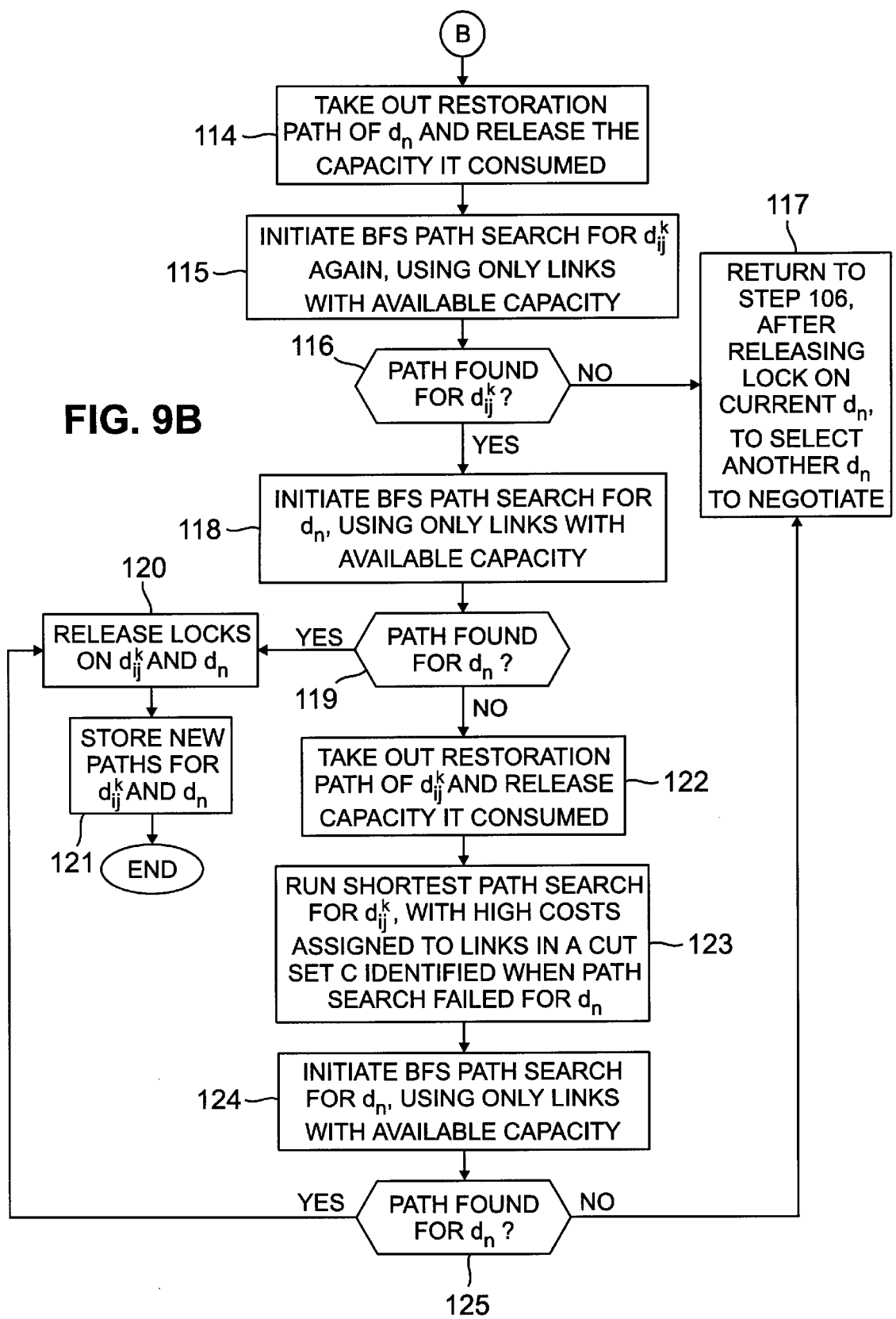

FIGS. 8, 9A and 9B illustrate the operation of an exemplary partially asynchronous distributed precomputation algorithm in accordance with the invention. The algorithm is suitable for automatic restoration of network traffic in an optical network, such as that described in conjunction with FIGS. 6 and 7 above, in the event of single link, node or span failure. The algorithm provides end-to-end path restoration in a distributed and asynchronous manner. The illustrative algorithm is distributed in nature in that restoration paths are computed and stored locally at each node, restoration path routing tables are activated locally at each node, failure is detected on a path by two end nodes independently, and the path restoration does not require intervention of a central controller. The algorithm is therefore scalable and applicable to networks of any size. The algorithm is asynchronous in that each node performs its computations independently regardless of the status of the other nodes. The algorithm provides very fast restoration in that the local storage of precomputed restoration paths allows immediate activation of the restoration path in the event of a primary path failure. Unlike conventional distributed restoration techniques, the algorithm does not require any specific computation or dissemination at the time of the failure.

As noted above, failures are generally detected in all-optical networks by measurements of optical signal power levels. For example, each wavelength may be independently monitored and when the power level of that wavelength falls below a certain threshold, failure is assumed. At the optical level, there is presently no suitable in-band or supervisory signaling available, and it is therefore usually not possible to isolate the failure to a particular link, node or span. It is generally only possible to conclude that a failure occurred somewhere on an end-to-end path. The illustrative algorithm to be described below accounts for this lack of a fault isolation mechanism by computing restoration paths which are node, link and span disjoint with the primary paths. This provides an added advantage in that the resulting restoration paths are failure independent. Therefore, as soon as a failure in an end-to-end path is detected, an alternate route using the restoration path can be triggered without trying to evaluate exactly where the failure has occurred. The algorithm is also generalizable to failure dependent restoration, where fault isolation information is either available via signaling mechanisms or is deduced from topology information propagated by the network.

Figure 5:
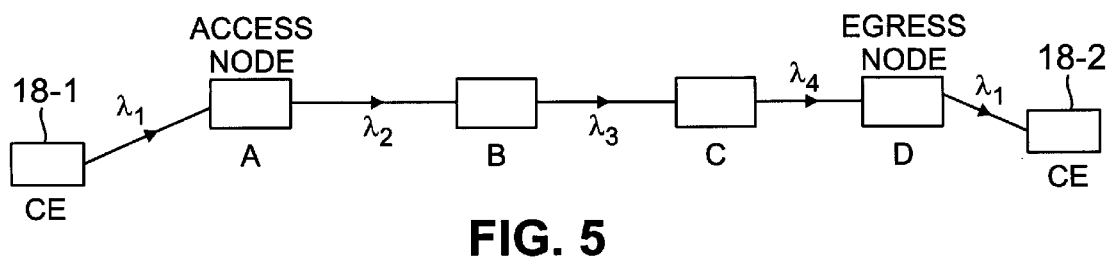

The algorithm to be described below is separated into two phases, Phase 1 and Phase 2, and includes a path search procedure, a link capacity control procedure, a contention locking procedure, and an optimization procedure. Phase 1 is illustrated in FIG. 8, and Phase 2 is illustrated in FIGS. 9A and 9B. The optimization procedure is part of Phase 2 and is used for demands which fail to find a restoration path in Phase 1. It should be noted that Phase 2 optimization procedure is optional, and may be eliminated in alternative embodiments of the invention. The objective of the illustrative algorithm is to compute node and link disjoint paths for each demand in the network by making the best use of available spare capacity. That is, the algorithm as illustrated, given a network topology, a set of demands and their primary routes, and link capacities, finds restoration paths for the maximum number of demands. Alternative versions of the algorithm may be used to solve other network problems, such as determining the minimum additional capacity required to achieve complete restoration. It should be emphasized that while the alternate path is failure independent, the utilization of spare capacity is in fact failure dependent, and the illustrative algorithm may be configured to exploit this feature. The source node of a given demand or a set of demands finds restoration paths for these demands and generally does not have to worry about demands originating elsewhere. In this sense the algorithm is fully distributed. As the computation progresses, it may be necessary, during the optimization procedure of Phase 2, to change a previously computed restoration path for a demand in order to provide a restoration path for another demand. The illustrative algorithm assumes that the network does not include wavelength interchange devices, such as those described in conjunction with FIG. 5 above, but alternative versions suitable for use with wavelength interchange devices will be apparent to those skilled in the art.

FIG. 8 shows a flow diagram of Phase 1 of the algorithm as implemented at a particular node i of the network. The notation $d^k_{ij}$ will be used to denote the kth demand originating at node i and terminating at node j. An independent path search is performed for each demand for which a restoration path is to be computed at node i. In step 80, a demand $d^k_{ij}$ which does not yet have a restoration path is selected for processing at node i. Before the path search procedure is started for demand $d^k_{ij}$, a locking message is sent along the primary path of $d^k_{ij}$ in order to lock out other demands contending for the same spare capacity, as shown in step 82. The reason for locking $d^k_{ij}$'s primary path is that only demands whose primary paths share a node or link with $d^k_{ij}$'s primary path may be disrupted by a single failure at the same time as $d^k_{ij}$, and therefore may require capacity to activate their restoration paths at the same time as $d^k_{ij}$. As a result, only these demands contend with $d^k_{ij}$ for network capacity. A determination is made in step 83 as to whether or not the locking was successful. If the locking was not successful, which may be the case if other demands already have a restoration computation underway at another node, the algorithm waits for a random amount of time in step 84, and then returns to step 82 to send the locking message again. Contention locking ensures that two contending demands performing path search operations at the same time will not create a deadlock. The link contention locking mechanism in this implementation of the algorithm assumes that two demands are contending if their primary paths share any node, link or span. Other suitable contention locking mechanisms may also be used.

After the locking message is accepted at the other nodes along the primary path of $d^k_{ij}$, the path search for demand $d^k_{ij}$ is initiated in step 85 using a distributed breadth-first search (BFS) technique. The BFS path search is a well-known process for finding a shortest path through a network, and will not be described in detail herein. Alternative path search techniques, including depth-first search techniques, could be utilized in alternative implementations. The nodes, links and spans of the primary path of $d^k_{ij}$, except for its two end nodes, are removed from consideration in the path search, such that any resulting restoration path will be node, link and span disjoint with the primary path as previously described. The path search is fully distributed in that each node has information only about its neighboring nodes in the network. If the BFS path search of step 85 results in a restoration path being found for demand $d^k_{ij}$, steps 86 and 88 indicate that the lock on the primary path is released, the restoration path information is stored for demand $d^k_{ij}$, and Phase 1 of the distributed precomputation algorithm is complete for that demand. The path information may be stored in the demand database 76 or routing tables 77 of the node as shown in FIG. 7, or in any other suitable memory location accessible by the nodal processor 58. If step 86 indicates that no restoration path was located in the BFS path search for demand $d^k_{ij}$ the algorithm then releases the lock on the primary path, and waits to enter Phase 2 for demand $d^k_{ij}$ as shown in step 87.

FIGS. 9A and 9B illustrate Phase 2 of the distributed precomputation algorithm as implemented at node i for demand $d^k_{ij}$. Step 90 corresponds to step 87 of FIG. 8, and shows the demands processed by node i waiting for the start of the Phase 2 portion of the algorithm. The receipt of a "Start of Phase 2" message causes the process to perform steps 92 through 100, which operate in manner similar to that described above for steps 80 through 85 of FIG. 8. If the BFS path search of step 100 results in a restoration path for demand $d^k_{ij}$, step 102 indicates that the path information is stored, and the lock placed on the primary path of demand $d^k_{ij}$ in step 94 is removed. If step 104 indicates that a restoration path is not found for demand $d^k_{ij}$, a set of "bottleneck" links with no available spare capacity (also referred to as a "cut" set) is identified as a side product of the path search procedure, and a contending demand $d_n$ utilizing these links is selected for negotiation, as shown in step 106. A second type of locking message, referred to as a "Type 2" locking message in order to distinguish it from the locking messages used in step 82 of FIG. 8 and step 94 of FIG. 9A, is then sent along the primary path of the demand $d_n$ in order to lock out other demands contending for the same spare capacity, as shown in step 108. If the locking is determined to be successful in step 110, the algorithm proceeds to FIG. 9B. If the locking was not successful, which may be the case if other demands already have a restoration computation underway at another node, the algorithm waits for a random amount of time in step 112, and then returns to step 108 to send the Type 2 locking message again.

In step 114 of FIG. 9B, the restoration path for demand $d_n$ is taken out of the set of allocated paths and the capacity the $d_n$ restoration path consumed is released. A BFS path search is again initiated for $d^k_{ij}$ using only links with available capacity, as shown in step 115. If step 116 indicates that no path is found for $d^k_{ij}$, the rerouting of $d_n$ is unsuccessful. Step 117 indicates that the process then returns to step 106 of FIG. 9A, after releasing the lock on the current $d_n$, in order to identify another demand $d_n$ for negotiation. If step 116 indicates that a path is found for demand $d^k_{ij}$, a BFS path search is initiated for $d_n$ using only links with available capacity, as shown in step 118. If step 119 indicates that a path is also found for $d_n$, then the rerouting of $d_n$ is successful. The locks on $d^k_{ij}$ and $d_n$ are then released in step 120, the new paths for $d^k_{ij}$ and $d_n$ are stored in step 121, and the algorithm ends for demand $d^k_{ij}$. If step 119 indicates that no path is found for $d_n$, the restoration path of $d^k_{ij}$ is removed and the capacity it consumed is released, as shown in step 122. A cut set of links for $d_n$ was identified as a side product of the failed path search of step 118. In step 123, $d^k_{ij}$ is rerouted using a shortest path search which avoids links in the cut set as much as possible by assigning high costs to those links. After rerouting $d^k_{ij}$ in this manner, a BFS path search is initiated for $d_n$ in step 124, using only links with available capacity. If step 125 indicates that a path is not found for $d_n$, the rerouting of $d_n$ was unsuccessful. The process then returns to step 106 of FIG. 9A, after releasing the lock on the current $d_n$, in order to identify another demand $d_n$ for negotiation. If step 125 indicates that a path is found for $d_n$, the rerouting of $d_n$ is successful. The locks on $d^k_{ij}$ and $d_n$ are then released in step 120, the new paths for $d^k_{ij}$ and $d_n$ are stored in step 121, and the algorithm ends for demand $d^k_{ij}$. A similar process may be implemented for other demands originating at node i. It is assumed for simplicity in the subsequent descriptions that the node i acts as the master in determining the route for the demand $d^k_{ij}$.

The algorithm illustrated in conjunction with FIGS. 8, 9A and 9B assumes without limitation that every node in the network maintains information on available spare capacity for each link incident on that node. Since available spare capacity depends on the failure, spare capacity information is maintained on a failure-specific basis. In addition, information is also maintained on the specific demands that are contending for the available spare capacity. An example of a link status table representing this information at node m on a link mn between nodes m and n at time t, denoted link mn(t), is shown below. The link status table is updated continuously throughout the course of the distributed precomputation. For example, the table may be updated whenever a new demand enters the link or an existing demand exits the link. The link status table may be maintained by a single node at one end of the corresponding link, or by two nodes at either end of the link with one of the nodes acting as a master and the other as a slave. The "Failure ID" identifies a specific failure, while the "Demands" column indicates which demands are affected by a particular failure. The "Available Spare Capacity" indicates the amount of capacity which would be hypothetically available after the occurrence of a particular failure.

| Failure ID | Demands using link mn | Total Spare Capacity | Available Spare Capacity |
|---|---|---|---|
| $f_1$ | $d^k_{ij}, d^p_{mn}$ | 3 | 1 |
| $f_2$ | $d^q_{ab}, d^v_{cd}, d^s_{ef}$ | 3 | 0 |
| $f_3$ | $d^k_{ij}$ | 3 | 2 |

As an illustration of the use of the above link status table, assume that the distributed precomputation algorithm starts at a time t=0 and that at this time the link status tables of all of the links are empty. When source node m computes a link and node disjoint restoration path for a demand $d^p_{mn}$ using spare network capacity, it has to query the link status table before it knows whether it can use a link. To do so, source node m sends the list of failures that affect $d^p_{mn}$'s primary path. Since at this time each link has available spare capacity, the first query of each link always returns a "yes" answer. After a restoration path is computed by the path search procedure, a request is sent to reserve one unit of bandwidth on each link on the restoration path. Each link on the end-to-end path grants the reservation and updates its link status table. Suppose that at some later time t, the status of link mn is as shown in the above link status table, and another node g is computing a restoration path for a demand $d^u_{gh}$. The node g then sends a query to the links involved in the path search. Suppose g wants to know whether link mn has capacity for demand $d^u_{gh}$. Assume that $d^u_{gh}$ is affected by failure $f_2$. When this query is received at node m, it indexes the mn(t) link status table using the failure $f_2$ and determines that the available spare capacity is already 0 and that the demands contending for this spare capacity are $d^q_{ab}$, $d^v_{cd}$ and $d^s_{ef}$, as shown in the table. A "no" answer together with this information is sent back by node m to node g.

As described above, all of the routing and capacity computations proceed in a distributed manner in the algorithm of FIGS. 8, 9A and 9B. Each node performs routing computations only for the demands originating at that node except while resolving contentions. Each node maintains link status tables only for the links incident on it. The entries in the link status tables correspond only to failures that necessitate the use of a particular link on the restoration path of a specific demand. The optimization procedure of Phase 2 is utilized only if the current demand is blocked and therefore unable to find a restoration path. The algorithm may be utilized to compute restoration paths in the event of multiple link, span or node failures. For example, if a computed restoration path is affected by a multiple failure, the algorithm may be configured to permit a fall-back to the use of end-to-end capacity discovery at the time of failure, using actual spare capacities available at the time of failure, with contention resolved by a random backup technique. Switching back to a primary path once the failure affecting the primary path is repaired is simplified by the fact that the algorithm does not utilize the capacities of the primary paths in generating the restoration paths. This is another advantage of the use of node and link disjoint restoration paths. The algorithm is also seamless for incremental changes to the network. For example, the algorithm may be run continuously in an incremental mode, in order to accommodate newly provisioned demands, demands affected by capacity changes in the network, or other demands which have not yet found a valid restoration path. There is no need to restart the algorithm from scratch to accommodate these and other changes in demands and capacity. The algorithm may be restarted from scratch after major provisioning or network capacity changes, or on a periodic but infrequent basis.

3. A Fully Asynchronous Distributed Precomputation Algorithm

FIGS. 10A–10D and 11A–11E show flow diagrams illustrating the operation of another exemplary distributed precomputation restoration algorithm in accordance with the invention. The algorithm described in this section is fully asynchronous, in that there is no coordination required in the relative timing of the restoration path computation processes carried out at different nodes. The lockout mechanism used in the partially asynchronous algorithm of the previous section is therefore not needed. Again, $d^k_{ij}$ will represent the kth demand between a source node i and a destination node j in the network. It will be apparent that the fully asynchronous restoration algorithm also provides many of the advantages of the partially asynchronous algorithm described in the previous section. The fully asynchronous algorithm is also divided into two phases, Phase 1 and Phase 2, with Phase 1 illustrated in FIGS. 10A–10D and Phase 2 illustrated in FIGS. 11A–11E. Phase 1 generally provides initial capacity allocation for a set of demands in the network, while Phase 2 is a contention resolution phase which provides. optimization of network capacity utilization.

Figure 10A:
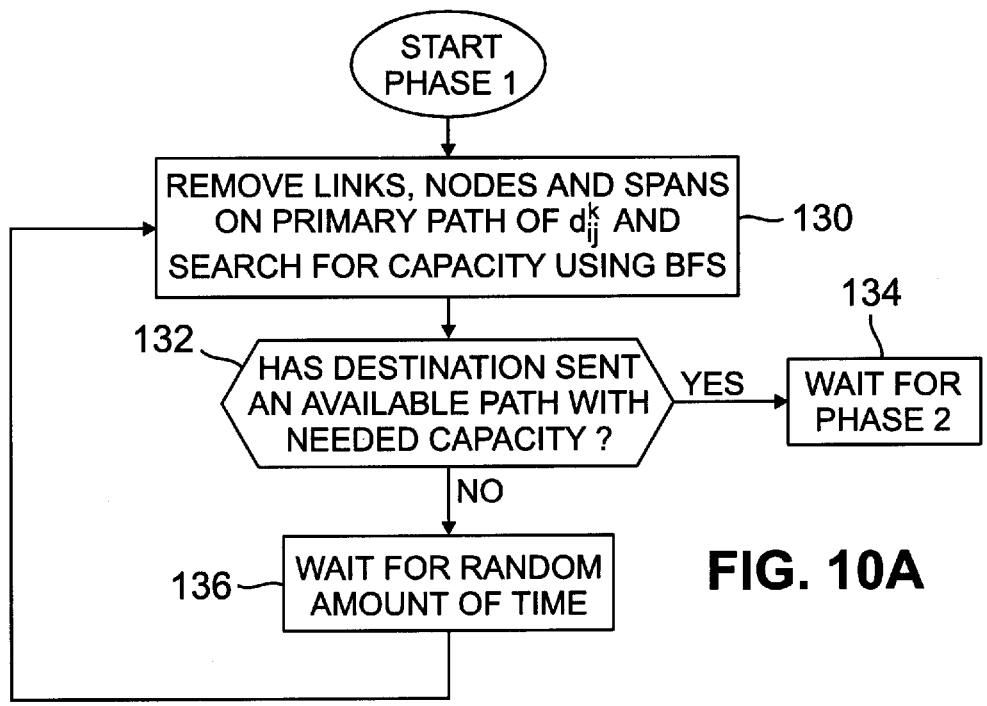
FIGS. 10A through 10D are flow diagrams illustrating the operation of a first phase of a fully asynchronous distributed precomputation algorithm in accordance with the invention.

FIG. 10A shows the Phase 1 process steps at the source node i for demand $d^k_{ij}$. In step 130, the links, nodes and spans of the primary path of $d^k_{ij}$ are removed from consideration in the restoration path search, and the path search operation is performed using a breadth-first search (BFS) technique. The BFS path search may utilize a flooding mechanism, in which a given source node simultaneously attempts to find available capacity on multiple paths. As part of the BFS path search, the source node i sends capacity allocation requests to the destination node j to discover and reserve capacity. In the source-to-destination direction, each intermediate node with available spare capacity allocates and reserves capacity in accordance with the request. The information sent by the source node in a given request message may include a demand identification (ID) for demand $d^k_{ij}$ and a corresponding failure set $F^k_{ij}$ for the demand $d^k_{ij}$. $F^k_{ij}$ is the set of failures that can affect the primary path of $d^k_{ij}$, and generally provides more information that the primary path itself. Only those intermediate nodes that have links that are unaffected by $F^k_{ij}$ will therefore reserve capacity, such that the resulting restoration path will be node and link disjoint with the corresponding primary path of $d^k_{ij}$. In order to avoid excessively long paths in the BFS path search, a hop constraint may be incorporated into the search.

For the demand $d^k_{ij}$, the destination node j may receive multiple messages indicating that capacity has been allocated on multiple paths for $d^k_{ij}$. The received messages also indicate the end-to-end paths on which this capacity has been reserved. It will be assumed without limitation that for each demand $d^k_{ij}$, there is some function of i,j and k which decides whether i or j acts as the source for this specific demand. The destination node j then sends return messages back on the end-to-end paths indicated in the messages received from the source node. The return messages specify that capacity has been reserved on a selected one of the paths, and requests release of capacity on all the other possible alternate paths. The BFS path search may be modified such that each source node attempts to find capacity on only a single path as opposed to attempting to find capacity on a multiplicity of paths via flooding.

In step 132, a determination is made as to whether the destination node j has sent an available restoration path with the capacity needed for demand $d^k_{ij}$. If the needed path has been sent, the process waits for the beginning of Phase 2 as shown in step 134. If the needed path has not been sent, a random backoff timer is started such that the process waits for a random amount of time, as shown in step 136, before returning to the path search step 130. While it is possible that one specific demand gets reservation on multiple paths on its first try, other demands may not have found even one end-to-end path with spare capacity. Therefore, source nodes that do not hear from the destination node within the random backoff time will try again, as indicated by steps 130, 132 and 136 of FIG. 10A. The backoff timer may be set, for example, by adding a random value with known mean and distribution to the sum of the round trip delay and the node processing times. Moreover, the total number of retries can be set to a reasonable maximum, such as ten. Even if the sum of the round trip delay and processing time, with the above-noted hop constraint, is equal to about 300 msecs, the total time required to perform the steps of FIG. 10A for a large number of source nodes can be less than a minute. The source nodes that are successful on the first try will wait in step 134 for a period equal to the time needed for maximum retries plus a safety factor, such as one minute, to ensure that all demands have completed Phase 1, and will then enter Phase 2. Similarly, the source nodes that are successful in the second or third try will prorate their waiting time in step 134 so that the total time before entering Phase 2 is less than about one minute.

Figure 10B:
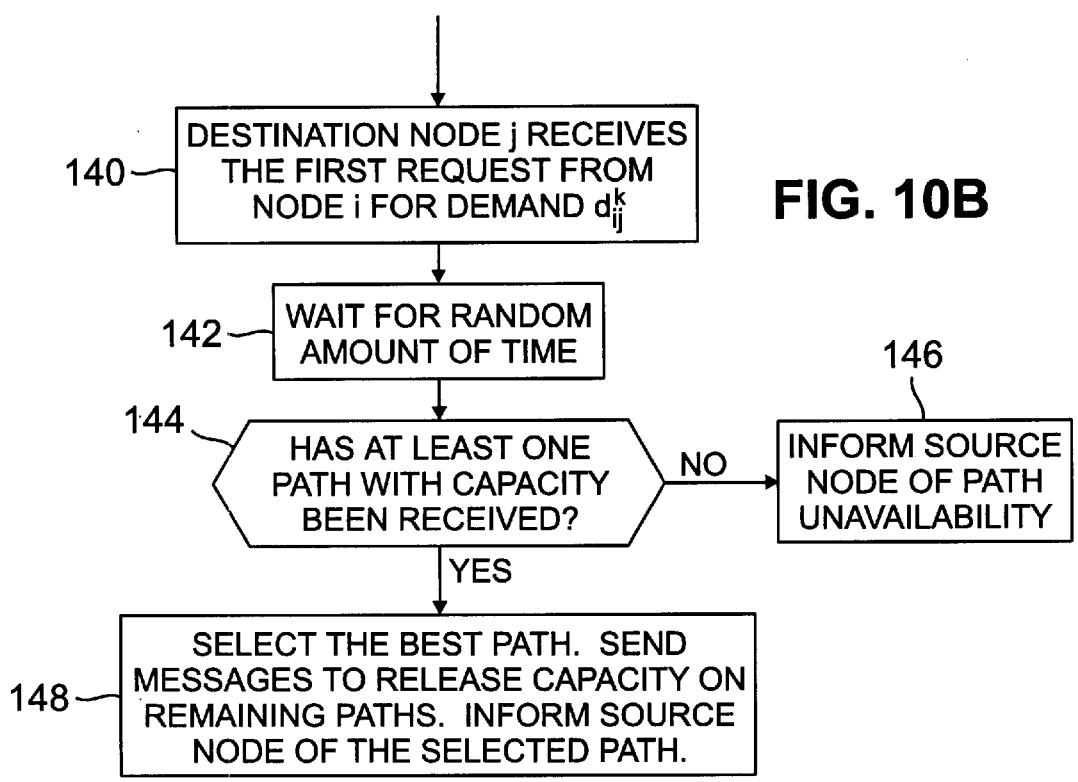

FIG. 10B shows the process steps of Phase 1 at the destination node j of demand $d^k_{ij}$. In step 140, node j receives the first request from node i for demand $d^k_{ij}$. Node j then starts a timer and waits for a random amount of time as shown in step 142. After expiration of the random time period, the process in step 144 determines whether at least one path with available capacity has been received. If no path with available capacity has been received after the expiration of the waiting time, the destination node informs the source node that the path is unavailable, as shown in step 146. If at least one path with available capacity is received in step 144, the destination node j in step 148 selects the best of the paths with available capacity, and sends messages requesting the release of capacity on the remaining paths. The best path may be the shortest path of the paths with available capacity, the path with the greatest available capacity, or a path selected based on any other reasonable path selection criterion. The destination node j then informs the source node i of the selected path.

Figure 10C:
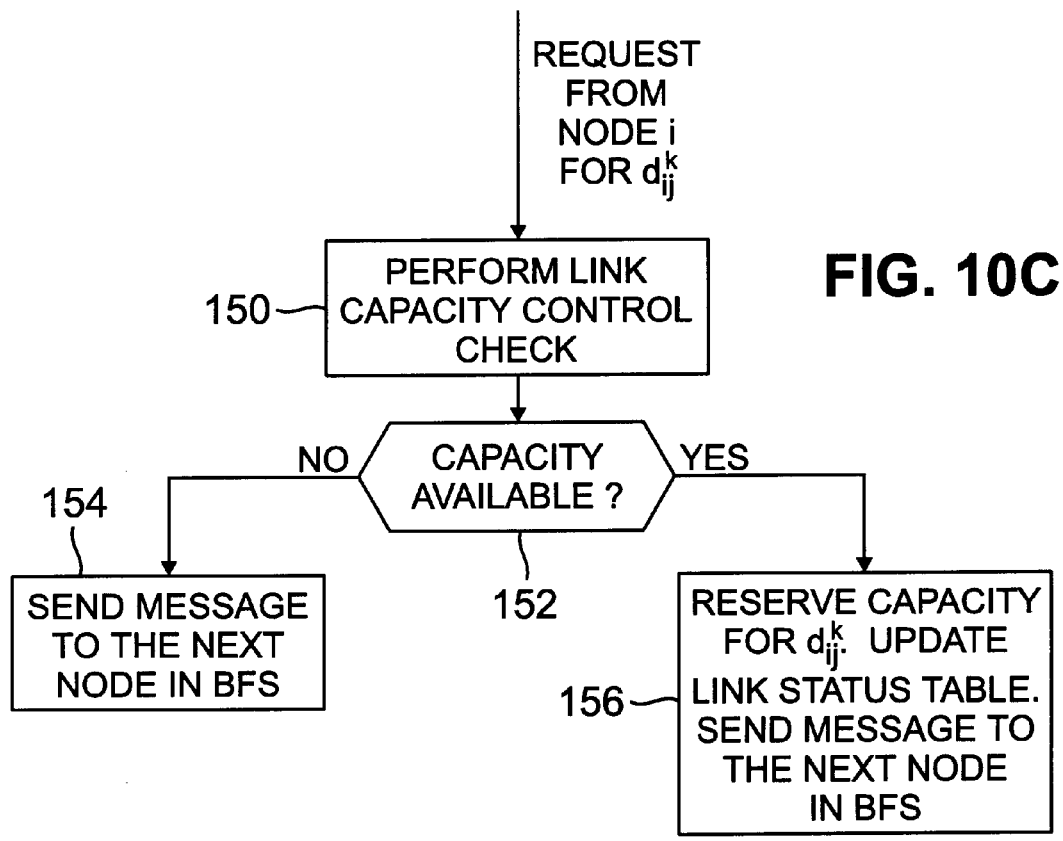

FIG. 10C illustrates the Phase 1 process steps at nodes which perform link capacity control operations. It will be assumed that these nodes include a node m which performs capacity control for a link inn. The node m receives a request from node i for capacity for a demand $d^k_{ij}$. In step 150, the node m performs a link capacity control check to determine if link mn has sufficient available capacity to accommodate demand $d^k_{ij}$. If sufficient capacity is not available in step 152, node in in step 154 sends a message to the next node in the BFS path search indicating that link mn does not have sufficient capacity to accommodate demand $d^k_{ij}$. If step 152 indicates that sufficient capacity is available on link mn, node m in step 156 reserves the capacity for demand $d^k_{ij}$, updates the link status table for link mn, and sends a message to the next node in the BFS path search to the effect that capacity has been reserved for demand $d^k_{ij}$ on link mn.

Figure 10D:
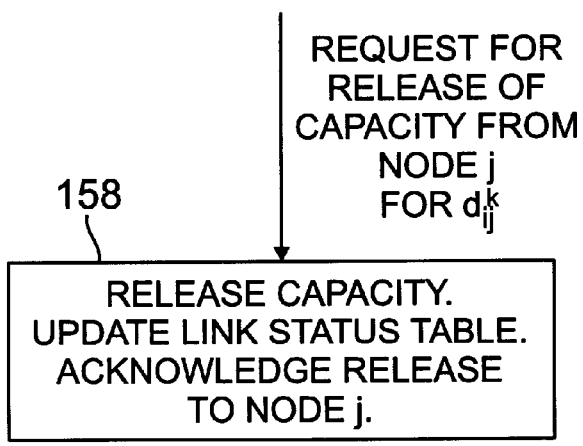

FIG. 10D illustrates additional Phase 1 process steps at nodes which perform link capacity control operations. As noted in conjunction with FIG. 10B above, the destination node j for demand $d^k_{ij}$ selects the best path of those paths having available capacity, and sends messages to request release of capacity on the unselected paths. In FIG. 10D, a request for release of capacity is received from node j in a node mn which had previously reserved capacity for demand $d^k_{ij}$ as described in conjunction with FIG. 10C above. In step 158, the node m releases the capacity previously reserved for demand $d^k_{ij}$, and updates the corresponding link status control table. The node m then acknowledges the release of capacity to the destination node j.

At the end of Phase 1, any source node which has found a restoration path for at least a subset of its demands has the restoration path stored locally at the node. In addition, a link status table in the format shown below is maintained for each link. As noted previously, the link status table may be maintained by a single node at either end of the corresponding link, or by both nodes in accordance with a master/slave arrangement.

| Failure ID | Demands using link ij as an alternate path | Total Spare Capacity | Available Spare Capacity | Link Status |
|---|---|---|---|---|
| $f_1$ | $d^1_{ij} d^2_{ij} d^1_{ab} d^3_{ef}$ | 4 | 0 | |
| $f_2$ | $d^1_{cd} d^3_{ef}$ | 4 | 2 | |

The "Link Status" column of the above table can take on one of four values. Link Status 0 indicates that spare capacity is available for a specific failure and that this link is ready to allocate and reserve capacity for a requesting demand. Link status 1 indicates that this link is currently participating in contention resolution with another demand and therefore can neither allocate capacity nor can it allow the requesting demand to enter contention resolution. Link status 2 indicates that the link has no spare capacity but it can allow the requesting demand to enter contention resolution. Link status 3 indicates that the link has no spare capacity and also that it will not entertain any requests from demands to enter the contention resolution state. The link status table is continuously updated as it receives requests for capacity from demands.

Figure 11A:
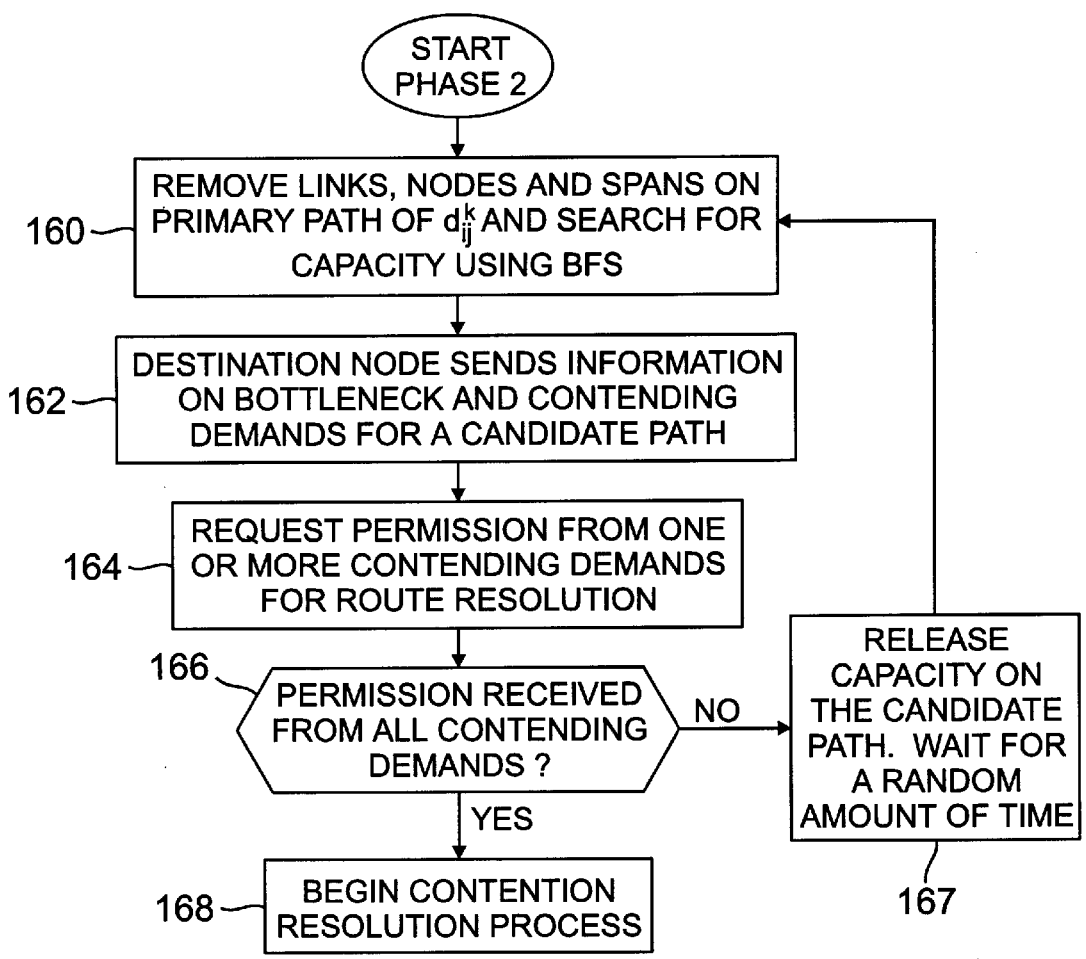
FIGS. 11A through 11E are flow diagrams illustrating the operation of a second phase of the fully asynchronous distributed precomputation algorithm of FIGS. 10A–10D.

FIG. 11A shows the Phase 2 operations of the fully asynchronous distributed precomputation algorithm at a source node i. Phase 2 begins for a particular demand $d^k_{ij}$ after the wait period in step 134 of FIG. 10A expires for that demand. The demands originating at node i thus enter Phase 2 asynchronously. It will be assumed for this illustration that source node i was unable to find a restoration path for demand $d^k_{ij}$ in Phase 1 of the algorithm. It will also be assumed that node i and all the other nodes in the network have network topology information stored locally. This topology information may be acquired as a byproduct of the flooding mechanism associated with the above-described BFS path search of Phase 1. In step 160 of FIG. 11A, source node i removes the links, nodes and spans of the $d^k_{ij}$ primary path from consideration, and initiates a path search for the required capacity using the BFS technique.

As part of the path search of step 160, source node i uses its locally-stored network topology information to send capacity requests to nodes in one or more end-to-end paths. The requests may contain identifiers of the source and destination nodes, an identifier of demand $d^k_{ij}$, and a failure set for the primary path of demand $d^k_{ij}$. The requests may also list the nodes on the corresponding proposed end-to-end path. In the forward direction from the source node to the destination node, each intermediate node reserves available spare capacity in accordance with the request and adds its link status to the message forwarded to the next node in the BFS path search. As will be described in greater detail below, the destination node sends the message back to the source node on the same end-to-end path. During transit of the capacity request messages in the forward and reverse directions, if an intermediate node observes that a previous or a subsequent link, respectively, has marked its link status as 1 or 3, then the intermediate node releases capacity it may have reserved for $d^k_{ij}$. If an intermediate node observes that a previous link has listed its status as 0 or 2, then each node in the reverse direction adds additional information. The additional information added by a node with link status 2 relates to contending demands. Such a node appends to the message a failure list and the corresponding contending demands. Source node i eventually receives this information, and uses it to resolve the contending demands.

In step 162 of FIG. 11A, the destination node j sends information regarding bottleneck links and contending demands for a candidate end-to-end restoration path to the source node i by appending this information to the message reflected back to node i. The node i then requests permission to resolve contention from one or more contending demands, as shown in step 164. In step 166, a determination is made as to whether contention resolution permission has been received from all contending demands for the given restoration path. If permission has not been received from all contending demands, step 167 indicates that the source node i releases capacity on the candidate restoration path, starts a random backoff timer, and returns to step 160 after waiting for the expiration of the backoff timer. If contention resolution permission is received from all of the contending demands in step 166, step 168 indicates that the algorithm then begins a contention resolution process, to be described in greater detail below.

Figure 11B:
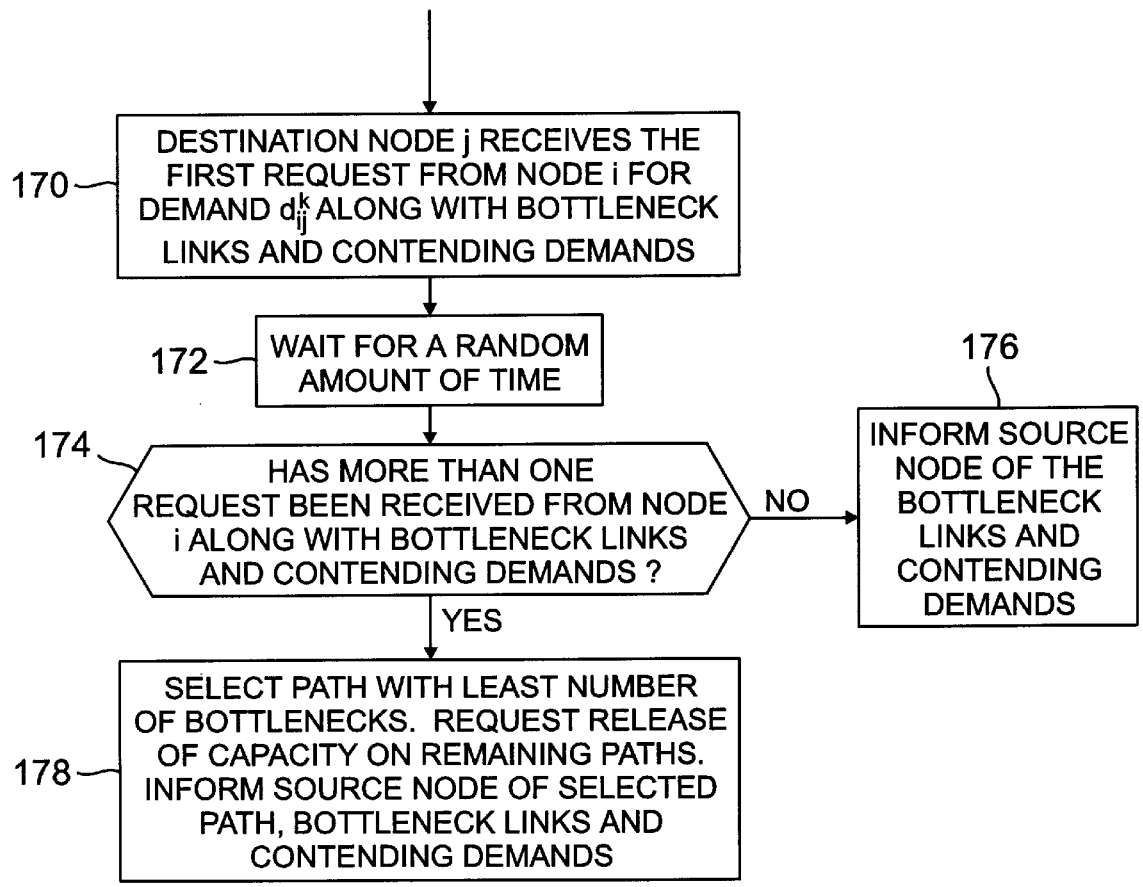

FIG. 11B shows the operations performed at the destination node j of demand $d^k_{ij}$ during Phase 2 of the fully asynchronous algorithm. In step 170, the destination node j receives a first capacity request message from source node i for demand $d^k_{ij}$ along with information regarding bottleneck links and contending demands. Node j then starts a random backoff timer, and waits for the expiration of a random amount of time, as shown in step 172. After expiration of the random time period, a determination is made in step 174 as to whether or not more than one capacity request has been received from source node i along with information on bottleneck links and contending demands. If step 174 indicates that only one capacity request has been received, destination node j in step 176 informs source node i of the corresponding bottleneck links and contending demands by placing this information in the message reflected back along the candidate end-to-end path to node i. If step 174 indicates that node j has received multiple capacity requests from source node i, such that there are multiple candidate end-to-end restoration paths, node j selects the candidate path having the least number of bottleneck links. Node j then sends messages requesting release of the capacity on the remaining candidate paths, and informs the source node i of the selected path and its corresponding bottleneck links and contending demands (step 178).

Figure 11C:
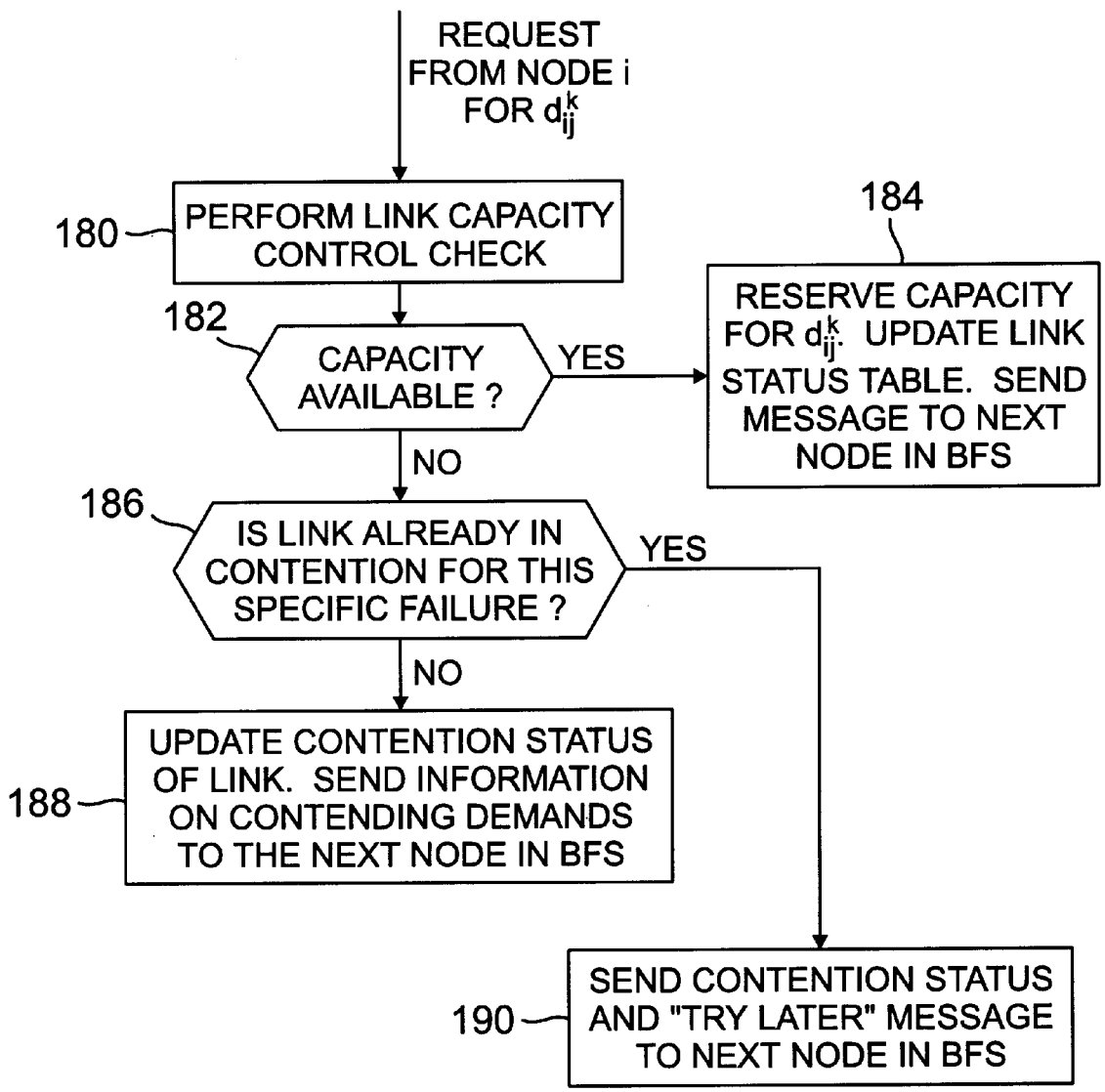

FIG. 11C shows the operations at nodes performing link capacity control. The link capacity control is initiated when a given node receives a capacity request from source node i for demand $d^k_{ij}$. In step 180, the given node performs a link capacity check. Step 182 indicates that if capacity is available on the link controlled by the given node, the node reserves capacity on the link for demand $d^k_{ij}$, updates the corresponding link status table, and sends a message to the next node in the BFS path search, as shown in step 184. If the link does not have sufficient available capacity to accommodate demand $d^k_{ij}$, step 186 indicates that a determination is then made as to whether or not the link is already in contention for the specific failure associated with demand $d^k_{ij}$. If the link is not already in contention for the specific failure, the contention status of the link is updated, and information on the contending demands is sent to the next node in the BFS path search, as shown in step 188. If the link is already in contention for the specific failure, step 190 indicates that the node sends the link contention status and a "Try Later" message to the next node in the BFS. The Try Later message will indicate to source, destination and other intermediate nodes that the link may be removed from contention at a subsequent time, such that it might eventually be used to supply capacity for the demand.

Figure 11D:
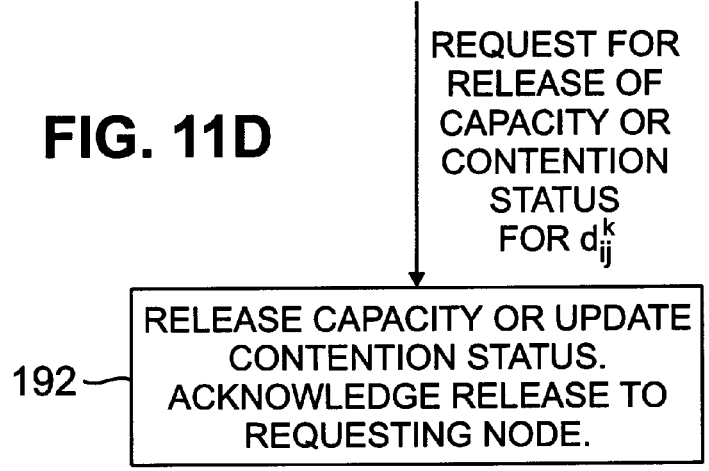

FIG. 11D illustrates the response of a given node performing link capacity control to a request for release of capacity or a request for demand contention status from another node. In this illustration, a request for the release of capacity or contention status regarding demand $d^k_{ij}$ is received in the given node. In step 192, the given node responds to the request by either releasing capacity or updating the contention status of the link. If the given node releases capacity, it acknowledges the release of capacity to the requesting node.

Figure 11E:
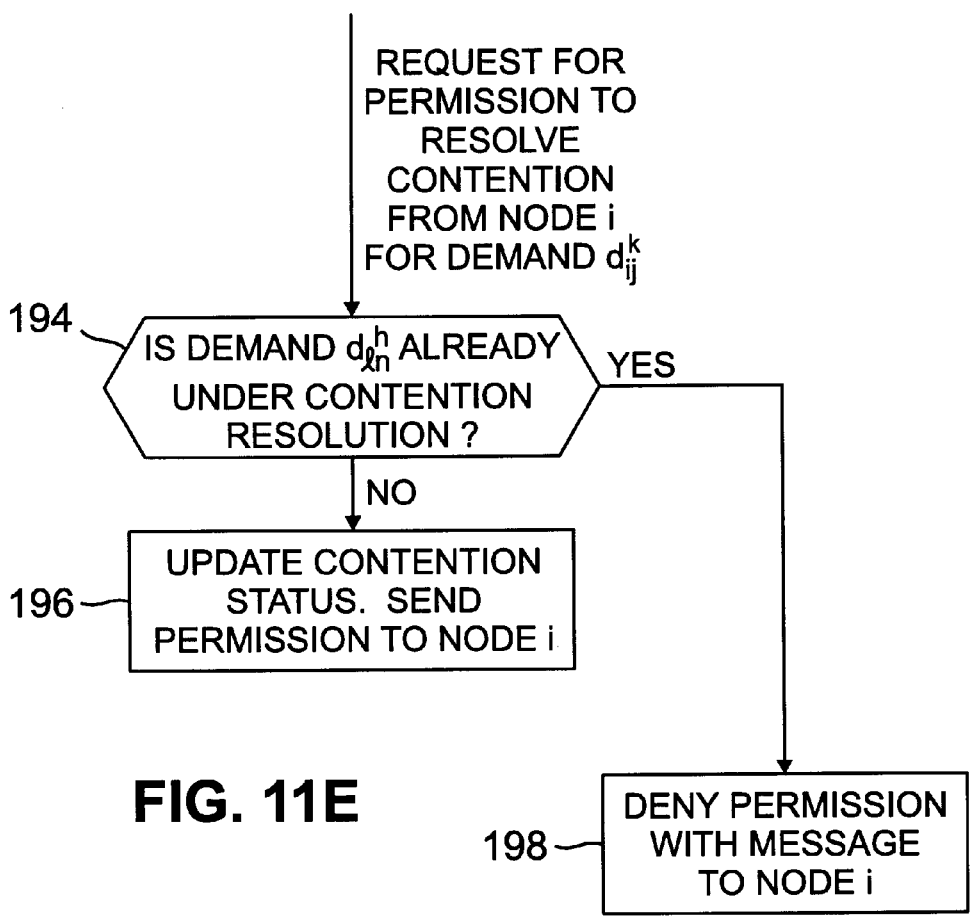

FIG. 11E shows the process steps performed at a given node l which computes a restoration path for a demand $d^h_{ln}$. The node l receives a request for permission to resolve contention from source node i for demand $d^k_{ij}$. In step 194, the node l determines whether or not the demand $d^h_{ln}$ is already under contention resolution. If demand $d^h_{ln}$ is not already under contention resolution, step 196 indicates that node l updates the contention status of demand $d^h_{ln}$ and sends contention resolution permission to node i. If demand $d^h_{ln}$ is already under contention resolution, step 198 indicates that node l denies contention resolution permission in an appropriate message to node i.

An example will now be given to further illustrate the operation of the Phase 2 portion of the fully asynchronous algorithm. Suppose that source node i receives a link status of 2 for one specific link pq and that the contending demands for a specific fault $f_l$ are $d^5_{ab}$ and $d^6_{ef}$. Then source node i sends a message to node a asking for permission to resolve contention on link pq between demand $d^k_{ij}$ and $d^5_{ab}$. It should be noted that each source node also maintains a status for each of its demands. The demand status variable can take on one of three values. Demand status 0 indicates that the node gives its permission to another demand to resolve contention. Demand status 1 indicates that the node has already given permission to another demand to resolve contention. Demand status 2 indicates that the demand is no longer a candidate for resolving contentions with any other demand.

Assume that the status of demand $d^5_{ab}$ is 0 when it receives a request from $d^k_{ij}$. Then node a sends the status information as well as the fault set affecting the primary path of $d^5_{ab}$ and the alternate path of $d^5_{ab}$. Upon receiving this information, node i tries to resolve contention between $d^k_{ij}$ and $d^5_{ab}$. Next, suppose the status of $d^5_{ab}$ is 1 when it receives a request from $d^k_{ij}$. Then node a sends this status to node i. Then node i sends a request message to node e to try to resolve contention between $d^k_{ij}$ and $d^6_{ef}$. If the status of $d^6_{ef}$ is also 1 then node i releases all the resources on the possible alternate path and tries either a different path immediately or the same path after the expiration of a reattempt timer. The distinction between demand status 1 and 2 is that in the former case, a requesting demand can try later to see if it could resolve contention while in the latter case, it would not try in the future to resolve contention with this particular demand. The reattempt timer value can be made adaptive by having larger values in the beginning and decreasing them over time as a function of the link status indicators as well as the demand status indicators.

In the above-described fully asynchronous algorithm, control over the capacity of a given link is maintained by the nodes at either ends of the link. Control over routing for a specific demand and permission to resolve contention is maintained by the source node associated with the demand. Furthermore, there is no need to maintain queues in order to prevent the possibility of deadlocks. The above-noted reattempt timers ensure that the contention resolution process is fully asynchronous. It should be noted that the timers in both Phase 1 and Phase 2 of the algorithm may be made adaptive such that their values decrease as computation progresses.

4. Alternative Contention Resolution Based on Set Partitioning

Figure 12:
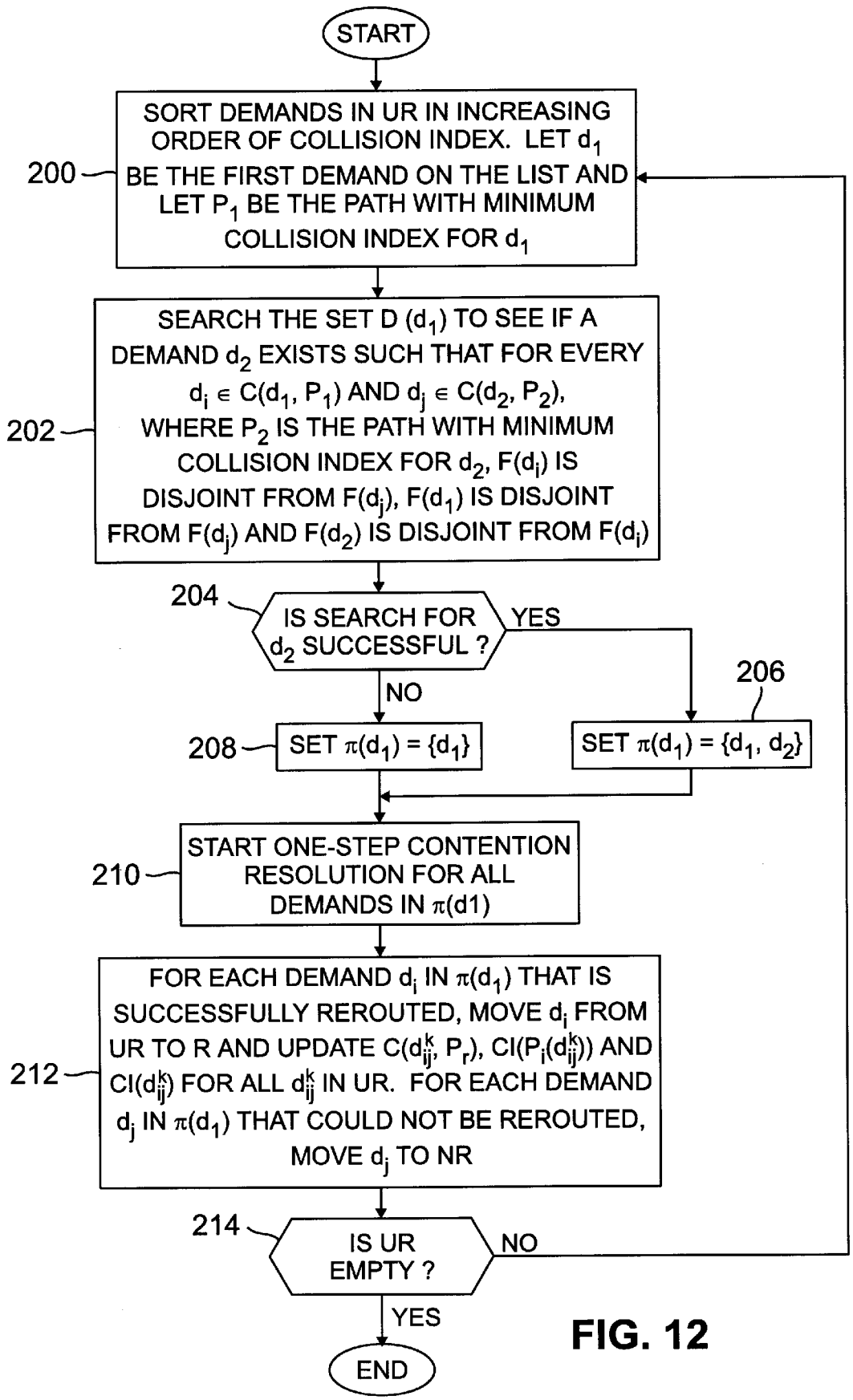
FIG. 12 is a flow diagram illustrating an alternative technique based on set partitioning for implementing the second phase of a distributed precomputation algorithm in accordance with the invention.

The contention resolution features of the distributed pre-computation algorithms described in the previous two sections may be implemented using an alternative technique based on set partitioning. FIG. 12 shows a flow diagram illustrating the operation of the alternative contention resolution technique. The technique may be viewed as a replacement for the Phase 2 operations of the algorithms previously described, and generally assumes that contention-free restoration paths have already been computed using the appropriate Phase 1 operations. The technique attempts to minimize the need for deadlock resolution such that contention resolution may be achieved with the exchange of fewer messages and in less time than in the previous algorithms. However, the technique generally does not have the advantage of being fully asynchronous.

The set partitioning contention resolution technique will be described using the following notation:

| | |
|---|---|
| $d^k_{ij}$ | The $k^{th}$ wavelength demand from source node i to destination node j. |
| $F(d^k_{ij})$ | Set of all faults that affect demand $d^k_{ij}$ on its primary path. |
| R | Set of all demands for which restoration paths were found in Phase 1. |
| UR | Set of all demands for which restoration paths were not found in Phase 1 because of collisions. |
| $C(d^k_{ij},P_r)$ | For $d^k_{ij}$ belonging to UR, $C(d^k_{ij},P_r)$ is the set of all routed demands in Phase 1 that $d^k_{ij}$ collides with on path $P_r(d^k_{ij})$ belonging to $P(d^k_{ij})$. |
| $P(d^k_{ij})$ | Set of all failure disjoint paths for demand $d^k_{ij}$. |
| $P_r(d^k_{ij})$ | A particular element of the set $P(d^k_{ij})$. |
| $CI(P_r(d^k_{ij}))$ | For $d^k_{ij}$ belonging to UR, $CI(P_r(d^k_{ij}))$ is the collision index for demand $d^k_{ij}$ on path $P_r(d^k_{ij})$. The collision index of a path is a function of the number of links of that path on which a given demand collides with a routed demand, and the number of routed demands it collides with on each link. |
| $CI(d^k_{ij})$ | Collision index of a demand $d^k_{ij}$ belonging to UR is the minimum of $CI(P_r(d^k_{ij}))$ over all paths in $P(d^k_{ij})$. |
| $D(d^k_{ij})$ | Set of all demands in UR whose fault sets are disjoint from $F(d^k_{ij})$. |
| $II(d^k_{ij})$ | For a demand $d^k_{ij}$ in UR, $II(d^k_{ij})$ is the set of all demands that can initiate contention resolution in parallel with $d^k_{ij}$. |
| D(S) | For any set $S \subseteq UR$, D(S) is the set of all demands in UR whose fault sets are disjoint from the fault set F(d) for every d belonging to S. |
| NR | Set of all demands for which no reroute can be found. |

It will be assumed without limitation that for every demand $d^k_{ij}$ belonging to UR, all of the quantities listed above are available from Phase 1 using one of the distributed computation algorithms described in the previous two sections. For simplicity of illustration, the alternative contention resolution technique will be described in detail below for a case in which no more than two demands are permitted to activate contention resolution in parallel. Extension to cases in which a substantially larger number of demands may be activated in parallel is straightforward, and will be readily apparent to those skilled in the art.

FIG. 12 shows the steps of an exemplary implementation of the alternative contention resolution technique. In step 200, the demands $d^k_{ij}$ in the above-defined set UR are sorted in increasing order of collision index $CI(d^k_{ij})$. The demand with the minimum collision index is the first demand on the sorted list of demands and is denoted $d_1$. The path having the minimum collision index $CI(P_r(d_1))$ for demand $d_1$ is denoted $P_1$. In step 202, the disjoint set $D(d_1)$ is searched to determine if a demand $d_2$ exists such that, for every $d_i \in C(d_1, P_1)$ and $d_j \in C(d_2, P_2)$, where $P_2$ is the path having minimum collision index $CI(P_2(d_2))$ for demand $d_2$, $F(d_i)$ is disjoint from $F(d_j)$, $F(d_1)$ is disjoint from $F(d_j)$, and $F(d_2)$ is disjoint from $F(d_i)$. In step 204, a determination is made as to whether or not the search for demand $d_2$ in step 202 was successful. If a demand $d_2$ was located in the search of step 202, step 206 indicates that the set $II(d_1)$ of all demands that can initiate contention resolution in parallel is the set $\{d_1, d_2\}$. If no demand $d_2$ was located in the search of step 202, step 208 indicates that the set $II(d_1)$ is the set $\{d_1\}$. In either case, the process continues with step 210, in which a one-step contention resolution is initiated for all demands in the set $II(d_1)$.

The one-step contention resolution of step 210 generally involves first attempting to reroute one or more demands in $II(d_1)$, and then using the capacity made available by the rerouting to determine a restoration path for $d_1$. A one-step contention resolution process, as applied to contending demands $d_1$ and $d_2$ where demand $d_2$ is to be rerouted to avoid the contention, will only reroute $d_2$ if $d_2$ has no contention on its proposed reroute path. If $d_2$ encounters contention on the proposed reroute path, then the contention resolution process between $d_1$ and $d_2$ will be terminated and $d_1$ will attempt contention resolution with another demand in $II(d_1)$. Other suitable contention resolution mechanisms may also be used in place of the one-step resolution of step 210. Step 212 indicates that each demand $d_i$ in $II(d_1)$ that is successfully rerouted in the contention resolution step 210 is then moved from the UR set to the R set, and the values of $C(d^k_{ij}, P_r)$, $CI(P_i(d^k_{ij}))$ and $CI(d^k_{ij})$ are updated accordingly. Each demand $d_j$ in $II(d_1)$ that could not be rerouted in step 210 is moved to the set NR. Step 214 indicates that steps 200 through 212 are repeated until the set UR of demands without restoration paths becomes empty, at which time the contention resolution process ends.

As an example of the operation of the FIG. 12 contention resolution process, assume there exists a demand d* in the set $D(d^k_{ij})$ such that the set $C(d^*, P^*)$ of demands that contend with d* on path P* is a subset of $D(d^k_{ij})$. Under the above-referenced one-step contention resolution of step 210, both $d^k_{ij}$ and d* can simultaneously launch their contention-resolution mechanisms without any possibility of colliding. This is because the FIG. 12 process ensures that neither d* nor any of its contending demands $C(d^*, P^*)$ have any fault in common with $F(d^k_{ij})$ and therefore neither d* nor any demand in $C(d^*, P^*)$ can contend for capacity with $d^k_{ij}$. However, it is possible that either d* or some demand in $C(d^*, P^*)$ may contend for capacity with some demand in $C(d^k_{ij}, P_r)$ as these demands may share a common fault. If that happens, the one-step contention resolution will disallow both contention-resolution processes, between $d^k_{ij}$ and the demand in $C(d^k_{ij}, P_r)$ and between d* and the demand in $C(d^*, P^*)$, and $d^k_{ij}$ and d* may then both resume contention resolution with other contending demands, if such other demands exist. If there is another demand d in the set $D(d^k_{ij})$ such that neither d nor any demand in $C(d^{}, P^{})$ have any faults in common with the fault set of d* or any demand in $C(d^*, P^*)$, then $d^k_{ij}$, d* and d** can all perform one-step contention resolution in parallel.

As noted above, the alternative contention resolution technique of FIG. 12 assumes the completion of a Phase 1 restoration path determination for each non-contending demand. Every contending demand d of set UR is then ordered in the manner described in conjunction with step 200. The set $C(d, P)$ of all demands that demand d contends with on path P is thus also assumed to be available. The maximum number of simultaneous demands d, d*, d**, ... that can launch one-step contention resolution is then found in the manner described in conjunction with steps 202 through 208. This part of the technique may be implemented in a centralized or distributed manner. If a distributed implementation is desired, then a common ordering of all contending demands is used, as per step 200, so that all source-destination nodes find the same set of demands d, d*, d**, ... for simultaneous contention resolution.

5. Distributed Precomputation Algorithms Using Probe and Request Messages

A number of other exemplary distributed precomputation algorithms in accordance with the invention will now be described in conjunction with the flow diagrams of FIGS. 13A through 17B. The algorithms will be described in the context of computing primary and restoration paths for a single new demand between a source node i and a destination node j in the presence of existing demands which have already been routed. The first exemplary algorithm, illustrated in FIGS. 13A–13B, 14A–14D and 15, computes two link-span-node disjoint paths for each demand, one of which is used for a primary path and the other for a restoration path, and therefore does not permit sharing of restoration capacity. The second exemplary algorithm, illustrated in FIGS. 16A and 16B, computes primary and restoration paths for all demands between all source and destination nodes in a distributed manner, with the same wavelength required on primary and restoration paths, and no sharing of restoration capacity. The third exemplary algorithm, illustrated in FIGS. 17A and 17B, computes primary and restoration paths for all demands, but permits sharing of restoration capacity between different demands not affected by any single failure.

The description of the algorithms will make use of the following notation:

| | |
|---|---|
| V | Set of nodes in the network. Each node may generate a demand to any other node in the network. Each demand is for 1 wavelength but many demands may be generated between the same source destination pair. |
| L | Set of links in the network, providing connectivity information. Each link connects two nodes in the network directly. |
| (p,q)(l) | For each link in L, (p,q)(l) denotes the nodes at the ends of a link l in set L. |
| $l_{pq}$ | Link in set L connecting p and q. |
| C(p,q), C(l) | Capacity of the link l connecting p and q in terms of number of optical fibers. For some applications, C(p,q) is given for each node pair (p,q). For others, the only information available is whether C(p,q) is required to be zero, i.e. no connectivity, or is permitted to be greater than zero. |

-continued

| | |
|---|---|
| N | Number of wavelengths per optical fiber. |
| R(i,j) | For a pair (i,j) of nodes, R(i,j) denotes the set of allowable routes between i and j. Note that all links in the path of a route r in R(i,j) must either have or be allowed to have capacity greater than zero. |
| TD(r) | For every route r in R(i,j), TD(r) is the set of routes in R(i,j) which are node-span-link disjoint with respect to r. It will be assumed without limitation that in the following description, every r has a non-null TD(r). |
| RP(i,j) | A set defined as $\{(r,s): r \in R(i,j), s \in R(i,j), s \in TD(r)\}$. |
| R | Set of all allowable routes. That is, $R = \{R(i,j); i,j \in V\}$. |
| G(r,λ) | For every route r in R(i,j) and a wavelength λ, G(r,λ) is an index given to the route r for wavelength λ to facilitate comparison with other routes in set R(i,j) for that wavelength. For example, the implication may be that, a priori, a lower indexed route is favored over a higher indexed route. These indices are either supplied through a central controller or calculated in a distributed fashion using algorithmic features described below. It is also possible to start with information supplied by the central controller and modify the indices as distributed information exchanges provide new information. If neither is available, the route length in number of hops may be used to index the routes. |
| G(r,λ,s,μ) | For every pair (r,s) in RP(i,j) and a pair of wavelengths λ and μ, G(r,λ,s, μ) is the index for the pairs (r,λ) and (s,μ) for primary and restoration routes between nodes i and j. A route having a higher index is preferred. Desired characteristics of the index include the following: (1) a route with more free capacity yields a higher index; (2) a route with a uniformly high capacity across links yields a higher index; and (3) a route with fewer links yields a higher index. The index may correspond to: (1) the minimum, across all links on a given pair of routes, of free capacity for selected wavelengths; (2) the index in (1) divided by the total number of links in the two routes; (3) a constant α multiplied by the minimum free capacity on a primary route plus a constant β multiplied by the minimum free capacity on a restoration path; or (4) α multiplied by the minimum free capacity on the primary divided by the number of links in the primary, plus β multiplied by the minimum free capacity on the restoration divided by the number of links in the restoration. The implications for the index G(r,λ,s,μ) are thus similar to those given for G(r,λ) above except that the pairs are generally more useful when both primary and restoration routes are determined for a demand at the time of provisioning, while the single route indices are generally more useful in deciding the restoration route given the primary route. It should be noted that the wavelength is required to be the same for the case when the primary and restoration routes are required to use the same wavelengths. Again, in absence of any other information, the lengths of the routes in number of hops can be used to provide an additional indexing of the pairs. Information subsequently generated by a central controller or a distributed computation is then used to update the initial indices. |
| FC(l,λ) | Free capacity on link l for wavelength λ as known to the nodes i and j. When restoration capacity is not shared, FC(l,λ) corresponds to C(l) times the number optical fibers on link l, minus the number of demands using link l and wavelength λ for primary or restoration routes. When restoration capacity is shared by demands with non-overlapping failure sets for at least some demand pairs, the free capacity is increased to reflect this sharing. |

FIGS. 13A–13B, 14A–14D and 15 illustrate an embodiment of a distributed precomputation algorithm in which restoration is provided by provisioning two span-node-link diverse paths for each demand, such that one of the paths can be used as a primary and the other path for restoration. In other words, this embodiment of the algorithm provides one-to-one restoration with no sharing of restoration capacity between different demands. Like the capacity for the primary route, the capacity for the restoration path is dedicated to a particular demand. Although this represents a relatively simple procedure for providing primary and restoration paths, it is also relatively expensive from a capacity perspective. Since the restoration capacity is not shared among demands and failures, the capacity requirements are likely to be higher in this embodiment.

However, a number of factors make this embodiment attractive for certain applications. First, in optical networking applications without wavelength interchange, failure isolation is generally difficult. Therefore, more complex algorithms using more sophisticated state and failure set information may be limited in their effectiveness, and improvements in terms of capacity requirements may not justify the additional complexity. Second, since the two failure disjoint paths are selected simultaneously in this embodiment, provisioning and restoration planning may both be done in a distributed manner, substantially in real time. With the use of a more complex algorithm, restoration path computations may take longer and thus may delay provisioning or leave a demand without a restoration path for a significant period of time. Third, while primary and restoration paths are selected simultaneously in this embodiment, only the primary path needs to be fixed. The restoration path, since it is not in use in the absence of failure, can be changed to make better use of capacity while still satisfying future demands. Finally, as a default, this embodiment does not allow sharing of a transmission resource, such as a wavelength in a given fiber on a given link. However, this fact is used only by the nodes at the two ends of each link in calculating remaining capacity. These calculations can be modified in an alternative embodiment to allow sharing and thus to free up additional capacity. The information needed to permit this can be communicated after the primary and restoration paths are set up so as not to delay provisioning. As will be described in more detail in conjunction with FIGS. 17A and 17B below, such an alternative embodiment allows fiber utilization close to more sophisticated algorithms using additional information exchange, and can therefore provide a simpler implementation in the shared restoration capacity case.

Figure 13A:
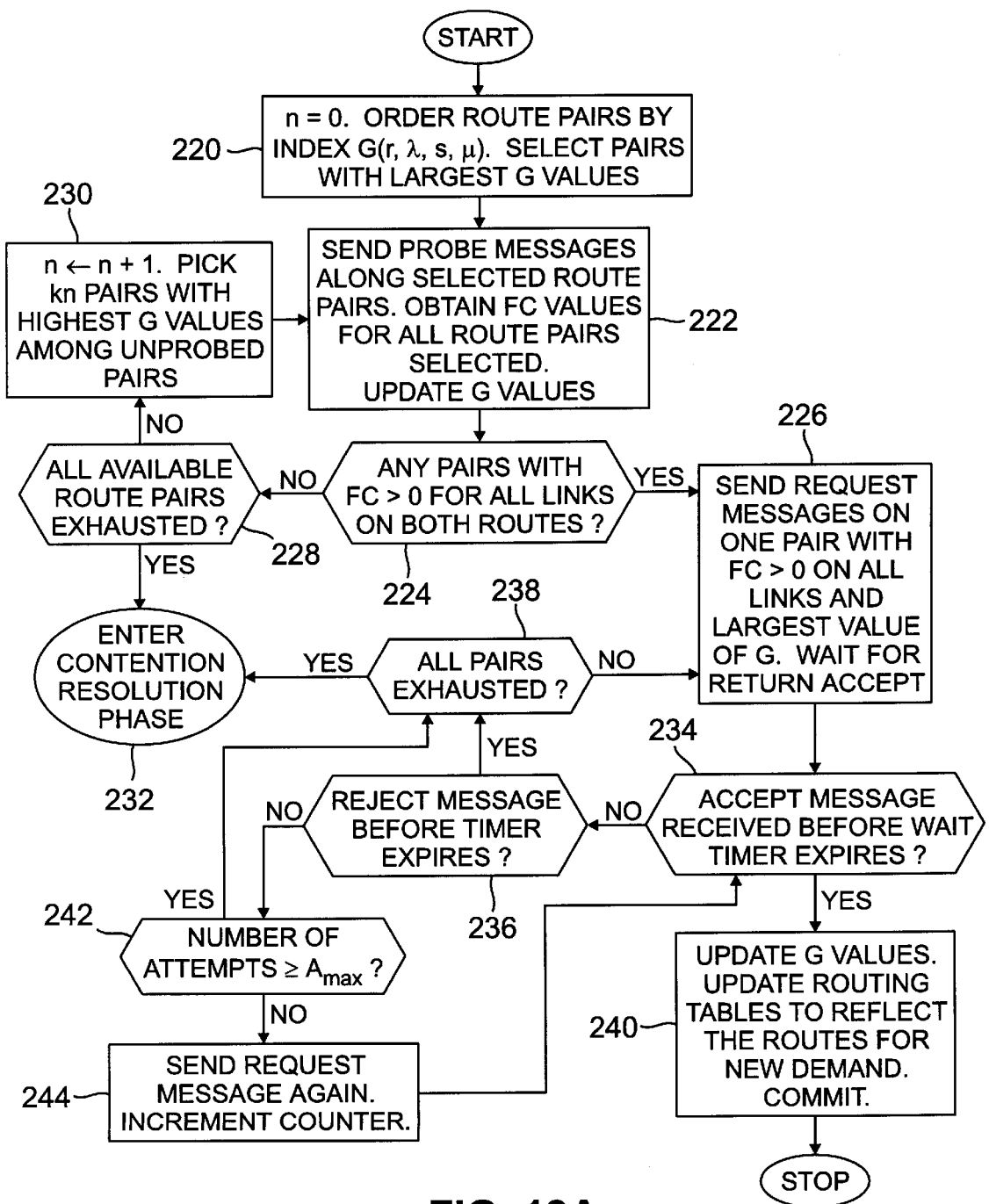
FIGS. 13A and 13B illustrate the operations at a source node in a search for primary and restoration paths in another exemplary distributed precomputation algorithm in accordance with the invention.
Figure 13B:
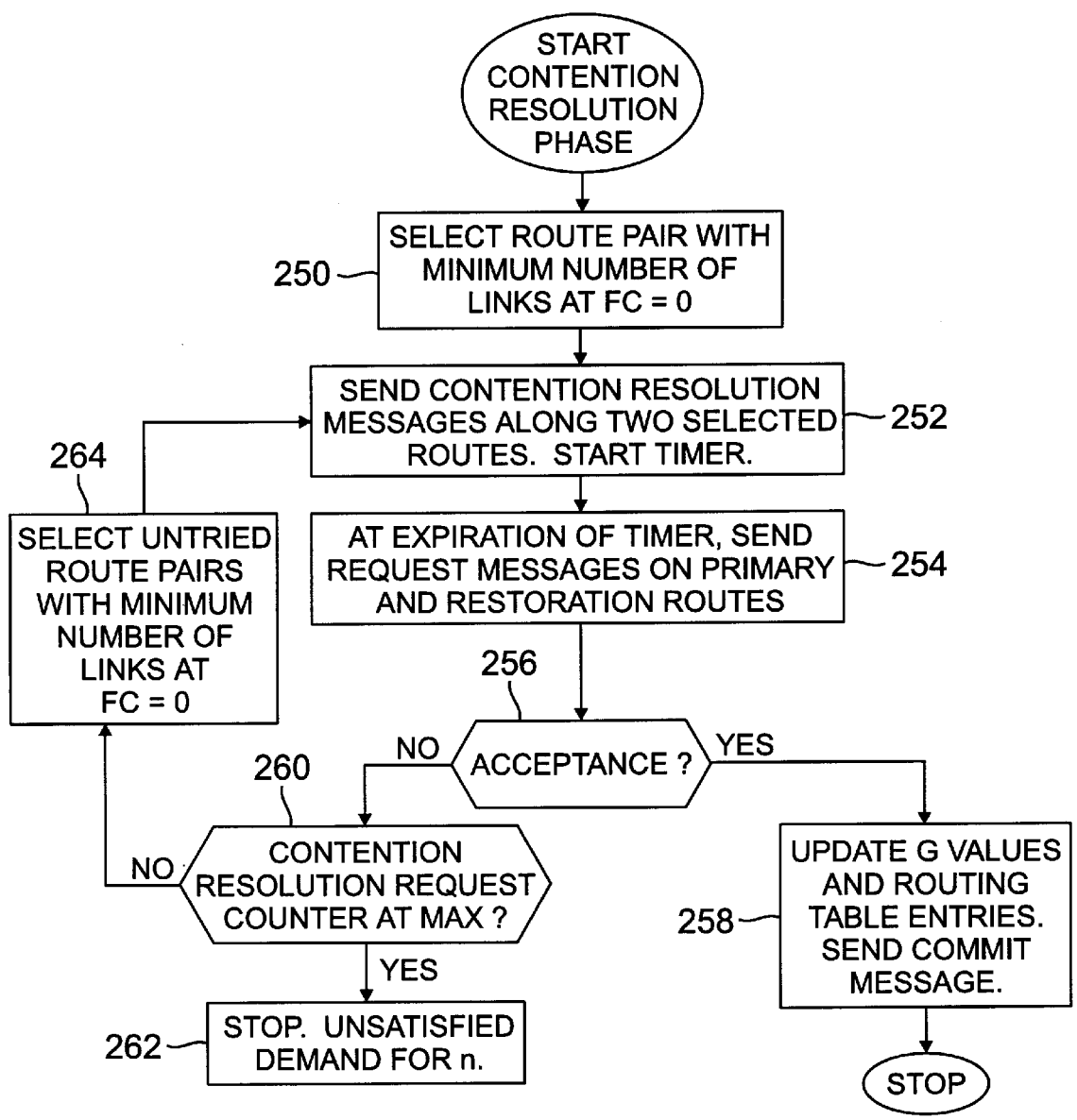

FIGS. 13A and 13B show the process steps at source node i in the computation of primary and restoration paths for demands $d^k_{ij}$ from source node i to source node j. As noted above, both primary and restoration paths for a given demand are computed at the same time in this embodiment. The algorithm is applicable to situations in which the primary and restoration paths are computed for a single new demand in the presence of established primary and restoration paths for existing demands, as well as situations in which many or all of the demands are involved in the path computations. In step 220 of FIG. 13A, the value of n is set to zero, and the route pairs are ordered in accordance with the corresponding values of the above-described index $G(r, \lambda, s, \mu)$. The route pairs having the largest G values will be selected first. It should be noted that only one wavelength is involved if the primary and restoration paths are required to have the same wavelength.

In step 222, PROBE messages are sent along the selected route pairs determined to have the highest G values in step 220. Free capacity values $FC(l, \lambda)$ are obtained for each of the selected route pairs. The G values are then updated in accordance with the route selections. In step 224, a determination is made as to whether any route pairs have FC values which are greater than zero on both the selected primary and restoration routes. If there is free capacity on all links for both routes of the route pairs, step 226 indicates that REQUEST messages are sent on the selected route pair which has free capacity on all links and the largest G values. When a REQUEST message passes a given link on a selected route, the given link checks if all of the preceding links have accepted the REQUEST message. If the preceding links have all accepted, the given link checks to see if it can accept the REQUEST message. If the link can accept the REQUEST message, it indicates acceptance by sending an ACCEPT message back to the source node i. The given link also passes the REQUEST message to the next link on the selected route. The given link may also start a link timer at this point. If the given link cannot accept the REQUEST message, the link indicates rejection by sending a REJECT message back to the source node, then inserts its current FC value in the REQUEST message and passes it to the next link in the route. Any link which sees that the REQUEST message was rejected by a preceding link simply inserts its current FC value and passes the message to the next link. The destination node reflects the message, along with all acceptance/rejection indicators and FC values, back to the source node. If a COMMIT message is not received by a given link before its corresponding link timer expires, any link which previously accepted the REQUEST message simply deallocates the capacity and updates its FC value accordingly.

Every link on each of the two routes of the selected route pair therefore either accepts the capacity request or denies it. In either case, the links will supply an updated FC value that is reflected back to the source node i. The source node i therefore waits for a return ACCEPT message. If there is not free capacity on all links of both routes of the selected route pair, step 228 determines whether all available route pairs have been exhausted. If all route pairs have not been exhausted, the value of n is incremented in step 230, $k_n$ pairs with the largest G values among the unprobed pairs are selected, and the process returns to step 222 to send PROBE messages along the $k_n$ selected pairs. If it is determined in step 228 that all available route pairs have been exhausted, the process enters a contention resolution phase in step 232. The contention resolution phase will be described in greater detail in conjunction with FIG. 13B below.

Step 234 involves a determination as to whether the ACCEPT message referred to in step 226 above is received before the expiration of a wait timer. If the ACCEPT message is not received before expiration of the wait timer, and a REJECT message is received in step 236 before expiration of the timer, step 238 determines whether all available route pairs have been exhausted. If all pairs are exhausted, the process enters the contention resolution phase of FIG. 13B as shown at step 232. If all pairs have not been exhausted, the process returns to step 226 to send REQUEST messages on another one of the selected route pairs. If the ACCEPT message is received in step 234 before the expiration of the wait timer, step 240 indicates that the G values are updated, and then the routing tables associated with source node i are updated to reflect the primary and restoration routes determined for the demand. The source node i may use the FC values and other information supplied by the links on attempted routes to update the G values after every attempt. The source node i then sends a COMMIT message along the accepted primary and restoration routes such that all links on these routes can maintain updated FC values. If the REJECT message is not received in step 236 before expiration of the wait timer, a determination is made in step 242 as to whether the number of attempts equals or exceeds a maximum number of attempts $A_{max}$. If the number of attempts is less than $A_{max}$, the REQUEST message is sent again along the selected route pair, and an attempt counter is incremented. If the number of attempts equals or exceeds $A_{max}$, the process returns to step 238 to determine if all route pairs have been exhausted, and then proceeds in the manner described above.

It should be noted that in certain situations the index G may not be available, while in other situations multiple route pairs may have the same G value. The latter is equivalent to not having any prior information on which to base a decision among the route pairs. In either case, the following modifications to the process of FIG. 13A may be implemented. Initially, k route pairs are selected out of the available route pairs having the same G value. PROBE messages are then sent on these route pairs. Each of the links on the routes will then send its current FC value, with an FC value equal to zero implying that the corresponding link has no available capacity at the designated wavelength. The FC values from the links are used to update the G values, and a REQUEST message is then sent on the route pair having the smallest G value. This process is continued until the capacity request is accepted by all links on both routes of a selected route pair. It should be noted that the relative congestion status of the link as given by the FC value is not updated in response to the PROBE message, but is instead updated in response to the REQUEST message. As noted above, if a COMMIT message is not received within a predetermined timeout period after the acceptance of the REQUEST message, an accepting link assumes that the request it accepted has been rejected by another link on the primary or restoration route and therefore deallocates the capacity reservation and updates its FC value. If all k selected route pairs fail, then another pair is selected and the above-described process is repeated, until all route pairs are exhausted. As in the FIG. 13A illustration, if all route pairs are exhausted without getting commitment from all links on both routes in a selected route pair, the process enters the contention resolution phase of FIG. 13B.

FIG. 13B illustrates the contention resolution process implemented at source node i for a simultaneous search for primary and restoration paths for a given demand. Since entering this phase implies that all route pairs have been exhausted, there is at least one link on one route of every route pair such that the FC value for that link and wavelength is equal to zero. Step 250 selects the route pair having the least number of links with an FC value of zero. In step 252, CONTENTION RESOLUTION messages are sent along the two routes of the route pair selected in step 250. The CONTENTION RESOLUTION messages are directed to links on both routes which have FC values equal to zero. A timer is also started in step 252. Step 254 indicates that after expiration of this timer, the source node i which sent the CONTENTION RESOLUTION messages in step 252 sends REQUEST messages on the primary and restoration routes of the route pair selected in step 250. Step 256 determines if the REQUEST messages are accepted. If the REQUEST messages are accepted, step 258 indicates that the G values and routing tables are updated and the COMMIT message is sent in a manner similar to that described in conjunction with step 240 of FIG. 13A. If the REQUEST messages are not accepted, step 260 checks to see if a contention resolution request counter is at its maximum value. If it is, the process ends as shown in step 262, with an indication that the given demand for which the contention resolution phase was called will remain unsatisfied. If the contention resolution request counter has not reached its maximum value for the given demand, another route pair with a minimum number of links having FC values of zero is selected in step 264, the contention resolution count is incremented, and the process continues in step 252 with the sending of CONTENTION RESOLUTION messages on the newly selected route pair.

FIGS. 14A through 14D show the process steps performed at a link l which is in a primary or restoration path probed by source node i. In step 270 of FIG. 14A, a PROBE message arrives at link l for wavelength $\lambda$. The PROBE message may have been generated in step 222 of FIG. 13A. Link l responds in step 272 by appending its free capacity value FC(l, $\lambda$) to the PROBE message and passing the message to the next link in the selected route.

Figure 14A:
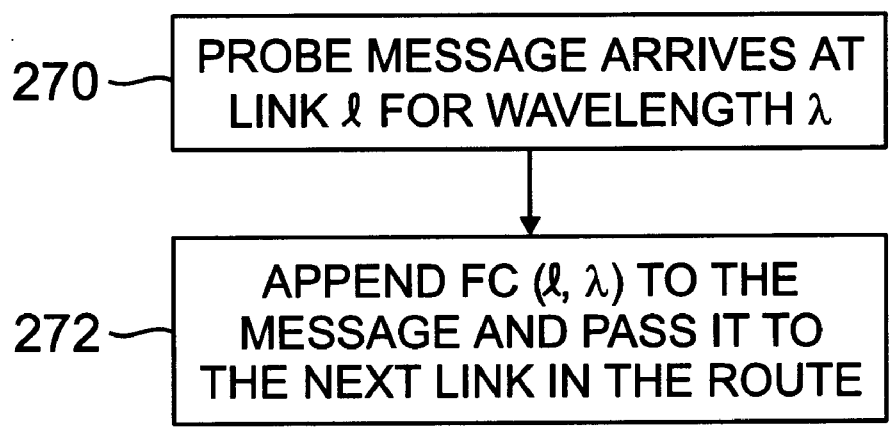
FIG. 14A through 14D show link operations associated with the path search of FIGS. 13A and 13B.
Figure 14D:
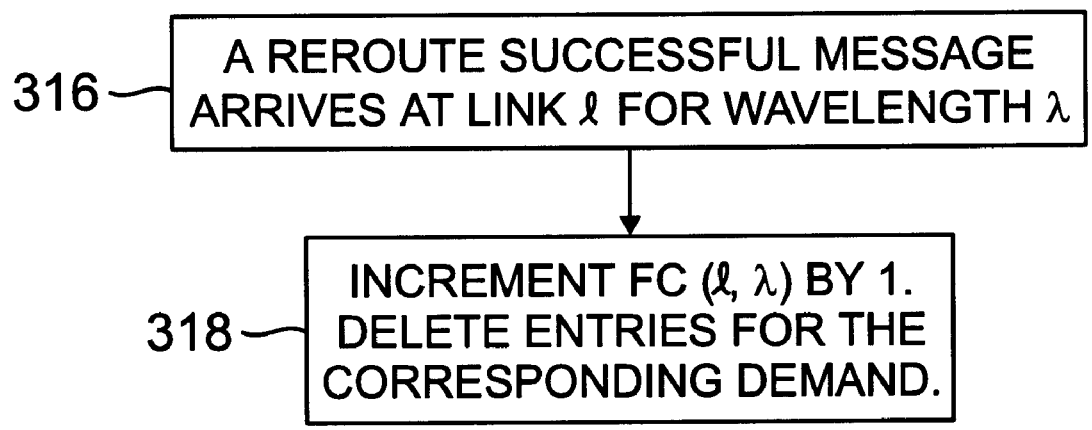
Figure 14B:
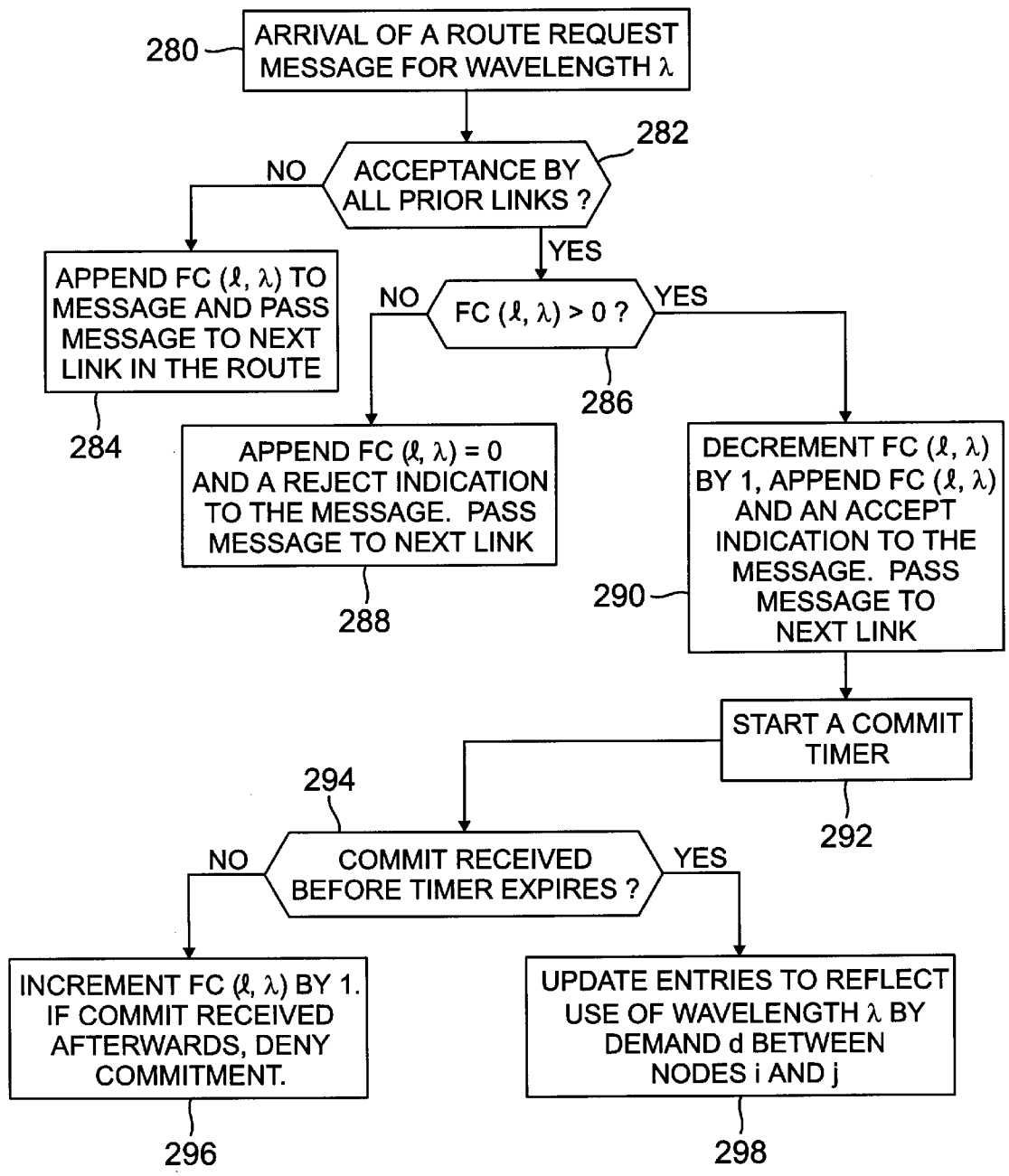

In step 280 of FIG. 14B, a REQUEST message for a particular selected route arrives at node l for wavelength $\lambda$. The REQUEST message may have been generated in steps 226 or 244 of FIG. 13A, or step 254 of FIG. 13B. A determination is made in step 282 as to whether the REQUEST message has been accepted by all preceding links in the route. If the REQUEST message was not accepted by all preceding links, step 284 indicates that the link appends its FC value to the message, and passes the message to the next link in the selected route. If the REQUEST message was accepted by all preceding links, step 286 determines whether the FC value associated with link l is greater than zero. If it is not greater than zero, link l appends an FC value of zero and a REJECT indication to the message, and passes it to the next link in the selected route, as shown in step 288. If the FC value is greater than zero, step 290 indicates that the FC value is decremented by one, appended along with an ACCEPT indication to the message, and passed to the next link in the route. A commit timer is started in step 292. Step 294 determines whether or not a COMMIT message is received from the source node i before the commit timer started in step 292 expires. If the COMMIT message is not received before expiration of the commit timer, the FC value is incremented by one as shown in step 296. If a COMMIT message is received after the FC value is incremented, it is denied by link l. If the COMMIT message is received before expiration of the commit timer, link l updates it routing table entries to reflect use of wavelength $\lambda$ by a particular demand d between nodes i and j (step 298).

Figure 14C:
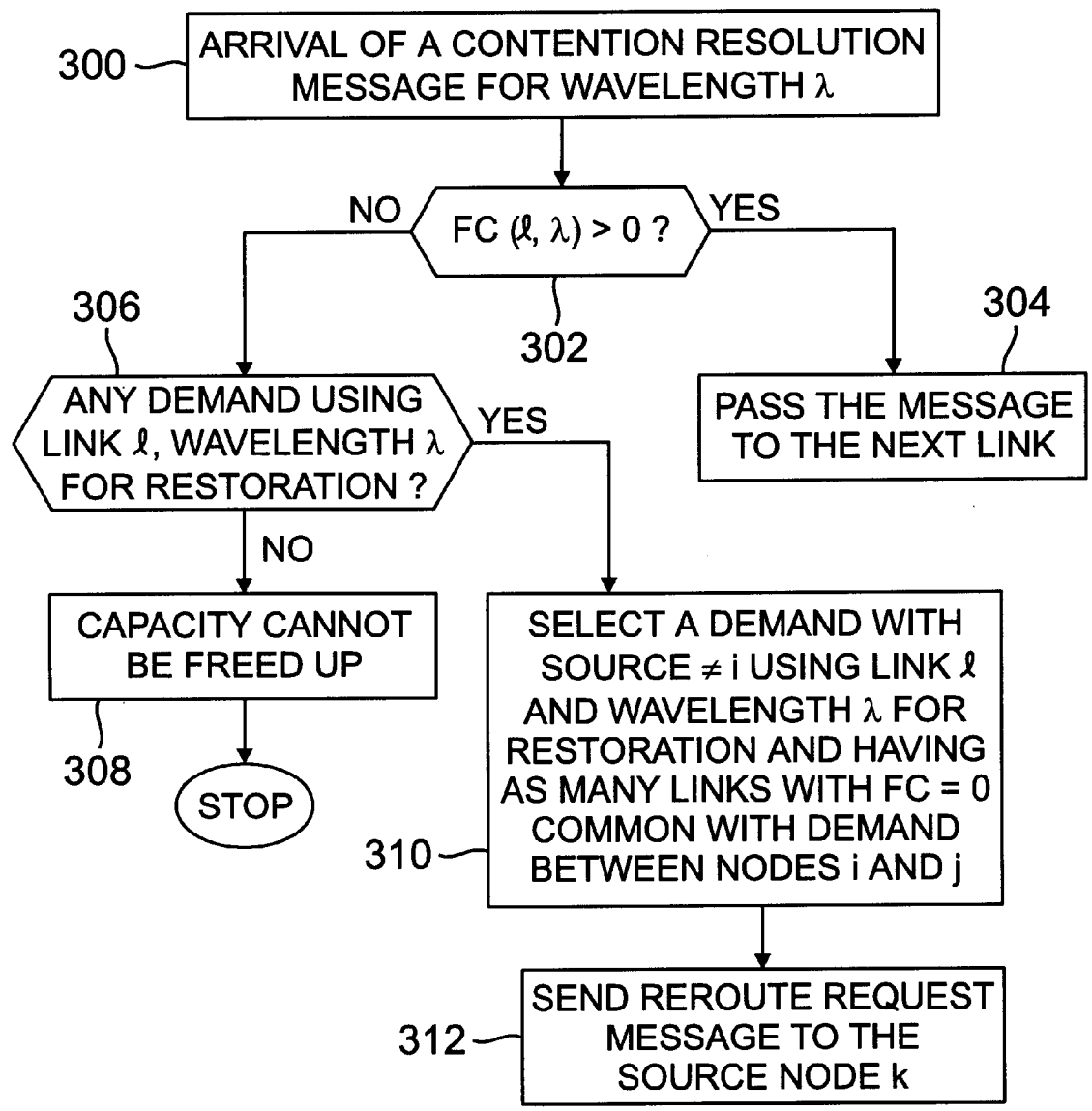

FIG. 14C shows the process steps at link l in response to receipt of a CONTENTION RESOLUTION message. In step 300, a CONTENTION RESOLUTION message arrives at link l for a wavelength $\lambda$. This message may have been generated in step 252 of FIG. 13B. Step 302 determines if the free capacity value FC(l, $\lambda$) for link l is greater than zero. If it is, the message is passed to the next link in the selected route, as shown in step 304. If the FC value is not greater than zero, step 306 determines whether or not any demand is using link l and wavelength $\lambda$ for a restoration path. If no demand is using link l and wavelength $\lambda$ for a restoration path, step 308 indicates that the required capacity cannot be freed up, and the process ends. If there is at least one demand using link l and wavelength $\lambda$ for a restoration path, step 310 selects a demand which has a source node other than node i, which is using link l and wavelength $\lambda$ for a restoration path, and which has the most links with an FC value of zero in common with a demand between nodes i and j. If several demands satisfy the step 310 criteria, such ties can be broken by selecting the demand which has the maximum number of overlapping links with the demand requesting a reroute.

In step 312, a REROUTE REQUEST message is sent to the source node of the demand selected in step 310. The source node can then attempt to reroute the demand using an alternate route, and an alternate wavelength if the primary and restoration routes are permitted to have different wavelengths. In order to determine which of several demands have the most links with an FC value of zero in common with the demand from nodes i to j, as set forth in step 310, link l will need to know the complete routes of any demands using it as a primary or restoration path. Performance analysis of actual networks using realistic data may be used to indicate whether this additional information is worth keeping at the links in a particular application. Once it is determined to keep this information at each link, it may be possible to further enhance the contention resolution process itself by providing, to the source node of the demand selected in step 310 for restoration path rerouting, information on the primary path of the demand requesting the reroute. The source node, in selecting alternative restoration paths to try, may then avoid paths which include links in common with the demand requesting the reroute.

FIG. 14D shows the process steps at link l in response to a successful rerouting of the demand selected in step 310 of FIG. 14C. If the rerouting of the selected demand is successful, the source node of the selected demand sends a REROUTE SUCCESSFUL message along its earlier restoration route. In step 316 of FIG. 14D, link l receives the REROUTE SUCCESSFUL message for wavelength $\lambda$. The FC(l, $\lambda$) value for link l is then incremented by one, and any routing table entries for the corresponding demand are deleted, as shown in step 318. In other words, if link l had an FC value which was at zero prior to the reroute, it updates its FC value to reflect the successful reroute.

Figure 15:
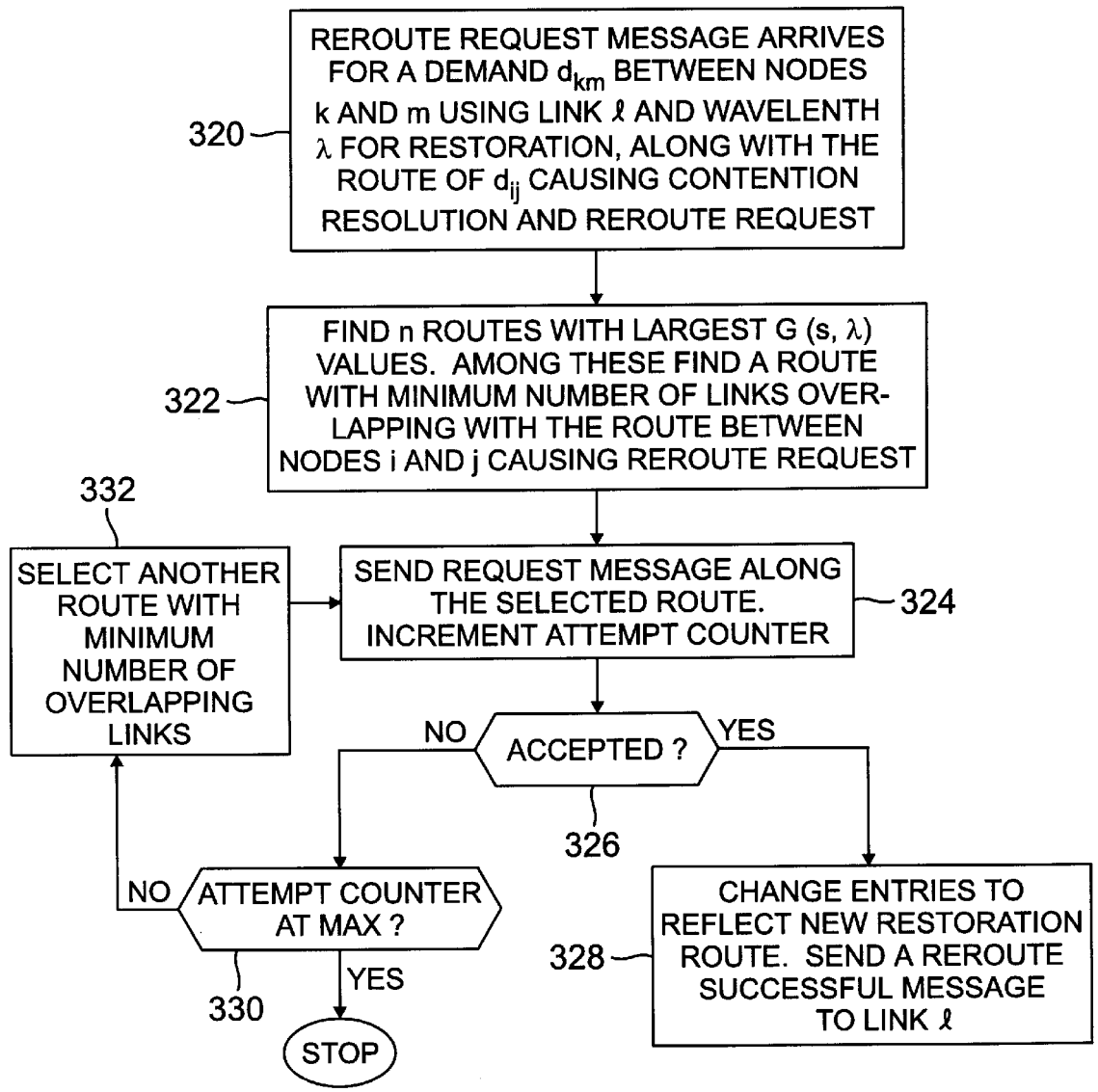
FIG. 15 illustrates the operations of a node receiving a reroute request generated in the path search of FIGS. 13A and 13B.

FIG. 15 shows the process steps of the algorithm at a node k which receives a REROUTE REQUEST generated in step 312 of FIG. 14C. Node k thus represents the source node of the demand selected for restoration path rerouting in step 310 of FIG. 14C. In step 320 of FIG. 15, a REROUTE REQUEST message arrives in source node k for a demand $d_{km}$ between nodes k and m using link l and wavelength $\lambda$ for its restoration path. Along with the REROUTE REQUEST message comes the above-noted information regarding the route of demand $d_{ij}$ which triggered the contention resolution and the subsequent request for the restoration path reroute. Step 322 finds n routes which have the n largest G(s, λ) values of all available routes. From among these n routes, the route having the minimum number of overlapping links with the route between nodes i and j which caused the reroute request.

In Step 324, a REQUEST message is sent along the route selected in step 322. Step 326 determines whether or not the REQUEST message was accepted by all of the links along the selected route. If it was accepted, the routing table entries associated with node k are changed to reflect the new restoration route for demand $d_{km}$, and a REROUTE SUCCESSFUL message is sent to link 1 (step 328). If the REQUEST message was not accepted in step 326, the value of an attempt counter is examined is step 330. If the attempt counter value is at its maximum value, the rerouting process ends for demand $d_{km}$. If the attempt counter is not at its maximum value, another route with a minimum number of overlapping links is selected in step 332, and the process continues with the sending of a REQUEST message along the selected route in step 324.

As noted above, a second illustrative algorithm to be described in this section determines primary and restoration paths for all demands together in a distributed manner. Such an algorithm may be useful in a variety of situations. For example, a central controller may have finished downloading information obtained from centralized computations, and the information may be in terms of actual routes or ordered tables of routes. Alternatively, there may be no update available from the central controller, but the previously computed routes are to be recalculated in accordance with a periodic schedule. In either case, the existing routes, along with link contention status information, may be used to provide a starting point in terms of search order. The algorithm to be described below may be utilized in an application in which existing primary routes are to remain unchanged while only restoration routes are recomputed, as well as in an application in which both primary and restoration routes are to be recomputed. The algorithm will be described in detail for the second application, but it will be apparent to those skilled in the art that the algorithm can be easily modified to cover the first application.

Figure 16A:
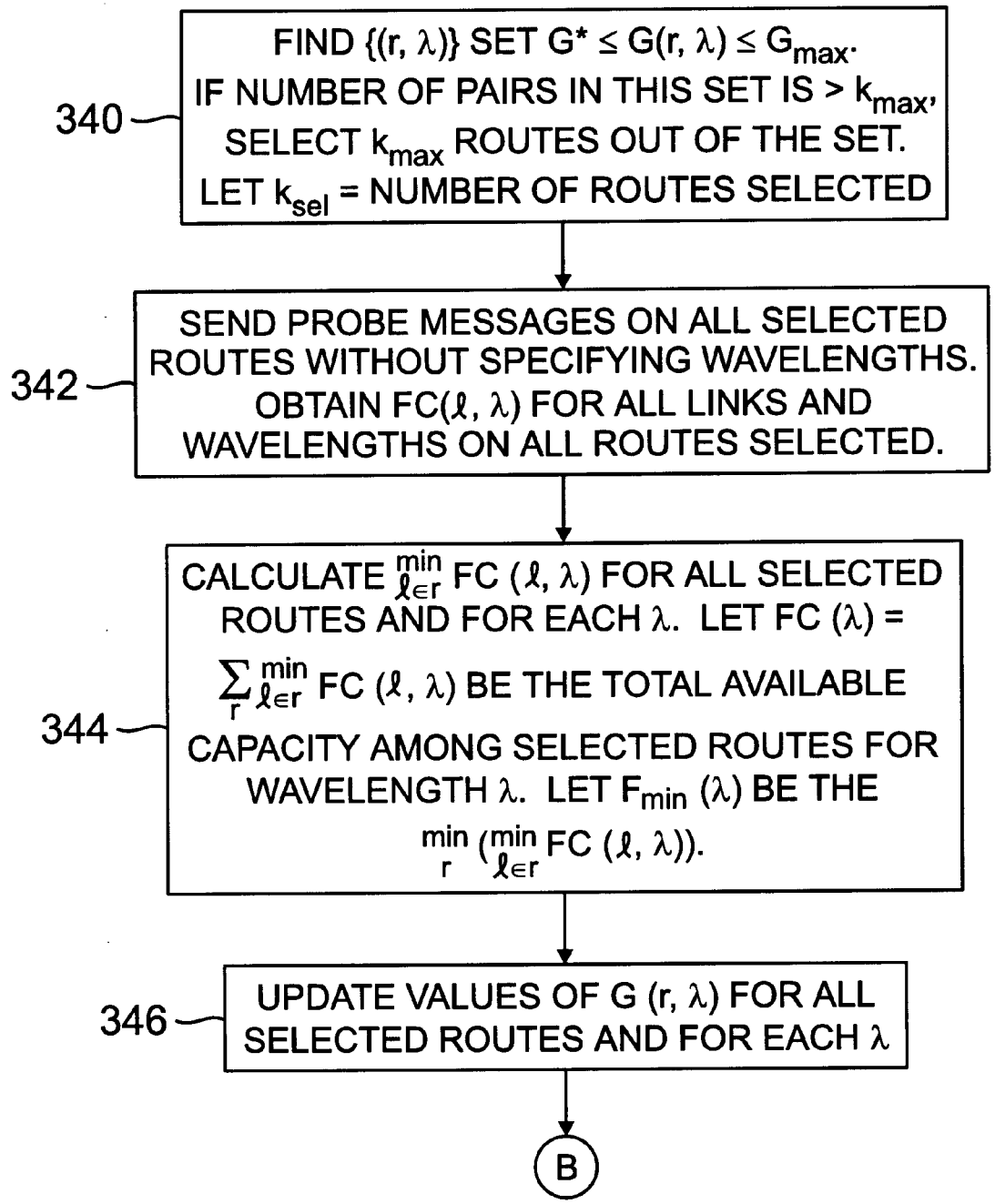
FIGS. 16A and 16B illustrate operations performed asynchronously by source-destination node pairs in a search for primary and restoration paths in accordance with the invention, in a case in which the same wavelengths are required on the primary and restoration routes and there is no sharing of restoration capacity.
Figure 16B:
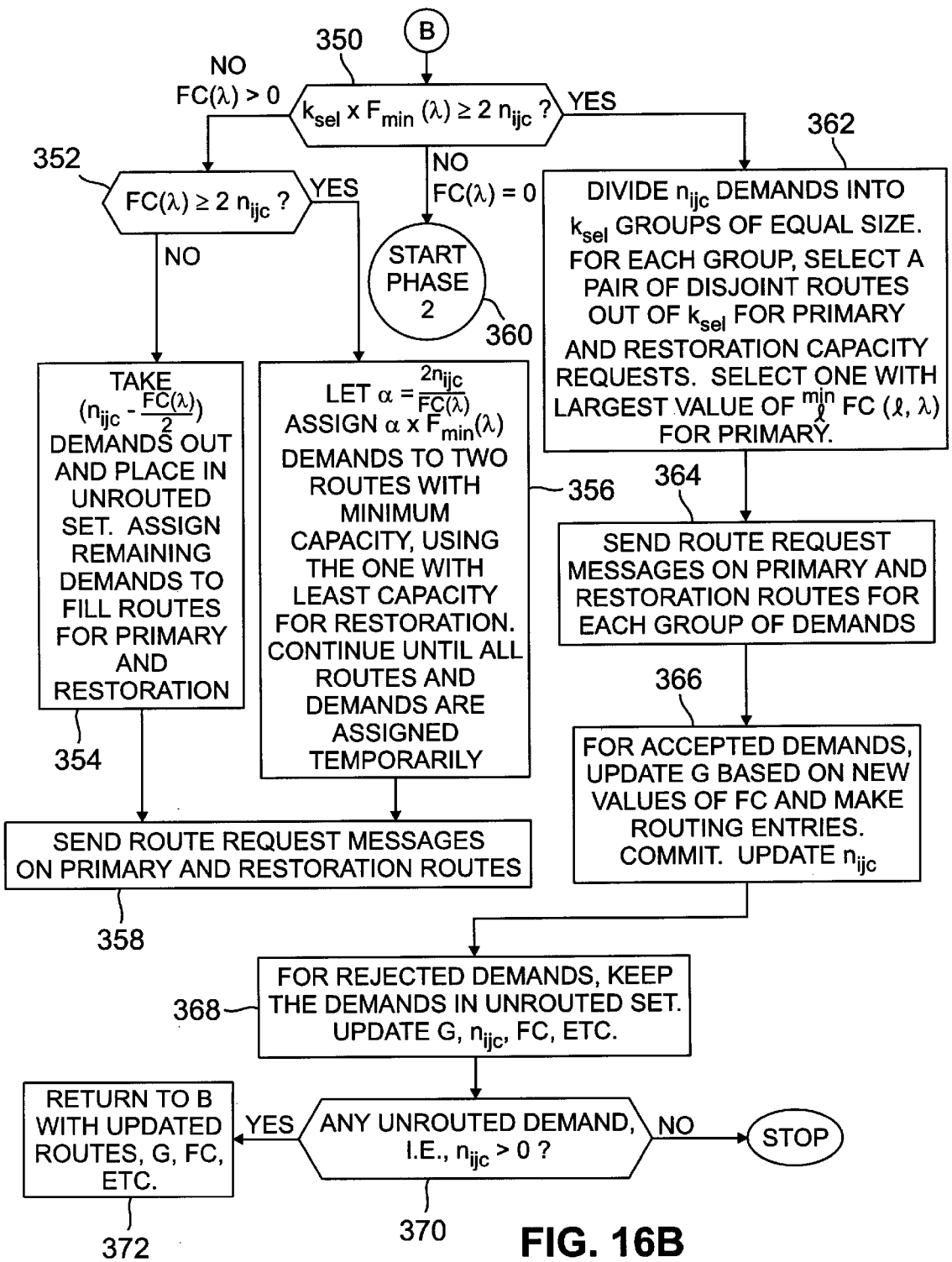

FIGS. 16A and 16B are flow diagrams illustrating the second algorithm to be described in this section. In this algorithm, as noted previously, primary and restoration paths for all demands are computed together, without any sharing of restoration capacity among different demands. It will be assumed without limitation that initial values of G are available at each of the source nodes, and that the available G values are each based on a single route and wavelength. In other words, it is assumed that the above-described G(r, λ) values are available. In applications in which these or similar values are not available, the reciprocal of the route length may be used to initiate suitable values for the index G. An alternative approach may be used when G(r, λ, s, μ) values are available from centralized computation or prior usage. As noted previously, the G(r, λ) values are generally best-suited for situations in which the same wavelength is required on both primary and restoration routes. The following additional notation will be used in conjunction with FIGS. 16A and 16B:

| | |
|---|---|
| $n_{ij}$ | Total number of demands between nodes i and j. |
| $n_{ijc}$ | Number of currently-unrouted demands between nodes i and j. |
| $k_{max}$ ($n_{ij}$) | Maximum number of routes to be tried at a given time. |
| $G_{max}$ | Maximum of G(r, λ) over all (r, λ). |
| $G^*$ | $G_{max}$ - h, where h is a parameter. |

Like the algorithms described in other sections herein, the algorithm illustrated in conjunction with FIGS. 16A and 16B below may be separated into a first phase, referred to as Phase 1 and involving contention-free path determination, and a second phase, referred to as Phase 2 and involving contention resolution and optimization operations. The portion of the algorithm illustrated in FIGS. 16A and 16B corresponds generally to the Phase 1 portion of the algorithm. Step 340 of FIG. 16A determines a set {(r, λ)} of routes for which $G^* \leq G(r, \lambda) \leq G_{max}$. If the number of routes in this set is greater than $k_{max}$, then $k_{max}$ routes out of the set are selected. The variable $k_{sel}$ is used to denote the number of routes selected.

In step 342, PROBE messages are sent on all of the routes selected in step 340, without specifying any particular wavelengths. The free capacity values FC(l, λ) are then obtained for all of the links and wavelengths on the selected routes. In step 344, the minimum value of FC(l, λ) is determined for all links on the selected routes, and for each wavelength. The total available capacity FC(λ) among the selected routes for wavelength λ is then determined as the sum, over all of the selected routes r, of the minimum values of FC(l, λ). $F_{min}(\lambda)$ is the minimum, over all of the routes r, of all of the minimum FC(l, λ) values. In step 346, the values of the G(r, λ) indices are updated for all of the selected routes and for each wavelength λ. The process then continues with the flow diagram of FIG. 16B.

Step 350 of FIG. 16B determines whether $k_{sel} \times F_{min}(\lambda)$ is greater than or equal to twice the above-described $n_{ijc}$ value. If $k_{sel} \times F_{min}(\lambda)$ is not greater than or equal to twice $n_{ijc}$, and FC(λ) is greater than zero, step 352 determines whether FC(λ) is greater than or equal to twice $n_{ijc}$. If FC(λ) is not greater than or equal to twice $n_{ijc}$, step 354 indicates that $n_{ijc}$–FC(λ)/2 demands are removed and placed in an unrouted set. The remaining demands are assigned to fill primary and restoration routes. If FC(λ) is greater than or equal to twice $n_{ijc}$, step 356 indicates that a value α is defined as $2n_{ijc}/FC(\lambda)$, and α times $F_{min}(\lambda)$ demands are assigned to two routes with minimum capacity, using the route with the least capacity for restoration. This step continues until all routes and demands are assigned temporarily. After completion of either step 354 or 356, step 358 indicates that REQUEST messages are sent on the primary and restoration routes. If $k_{sel} \times F_{min}(\lambda)$ is not greater than or equal to twice $n_{ijc}$, and FC(λ) is equal to zero, step 360 indicates that Phase 2 of the algorithm then begins. As noted previously, Phase 2 of the algorithm corresponds generally to a contention resolution phase similar to that described in conjunction with FIG. 13B above. If $k_{sel} \times F_{min}(\lambda)$ is greater than or equal to twice $n_{ijc}$, step 362 indicates that the $n_{ijc}$ demands are divided into $k_{sel}$ groups of equal size. A pair of disjoint routes is selected out of each of the $k_{sel}$ groups, and is used for primary and restoration path capacity requests. The route with the largest minimum value of FC(l, λ) over all of its links l is selected as the primary route.

In step 364, route REQUEST messages are sent on the selected primary and restoration routes for each of the $k_{sel}$ groups of demands. In step 366, the G index values are updated for accepted demands, based on the corresponding new FC values. Appropriate routing table entries are made, and a COMMIT message is sent. The value of $n_{ijc}$ is also updated. Step 368 indicates that the rejected demands are kept in the unrouted set, while the corresponding G, $n_{ijc}$, FC and other values are updated. Step 370 determines whether there are any unrouted demands, or in other words, whether $n_{ijc}$, is greater than zero. If $n_{ijc}$ is greater than zero, the process returns to the beginning of FIG. 16B at step 350 using the updated routes and updates G, FC and other values, as indicated in step 372. If $n_{ijc}$, is not greater than zero, there are no unrouted demands, and the process ends. As noted above, the Phase 1 portion of the algorithm described in conjunction with FIGS. 16A and 16B can be executed asynchronously by all source nodes. Additionally, source nodes may act on multiple demands simultaneously, especially in sending PROBE messages.

At the end of Phase 1, there may be a number of unrouted demands. Phase 2 of the algorithm may be implemented such that changes are not permitted to the primary routes of demands which have been assigned primary and restoration routes. However, Phase 2 may permit changes in the restoration routes of previously-routed demands so as to allow more demands to be satisfied. It is assumed without limitation that all source nodes know the end of Phase 1 and beginning of Phase 2. This may be achieved through simple message exchanges or through suitably large timer from the beginning of Phase 1. The Phase 2 portion of the algorithm may be implemented in a manner similar to that described in conjunction with FIG. 13B above. The possibility that simultaneous search for routes by many demands may lead to deadlocks can be handled using one of the following two approaches.

A first approach allows asynchronous searches to resolve contention and relies on the fact that there is sufficient randomness in the start times of the various source nodes such that deadlocks are not created. Of course, the first demand to get a restoration route will lock the capacity out so others will not get it. Deadlock occurs only when two demands are denied at two different links while there is capacity to satisfy any one of them by itself. Random time gaps may keep this probability small. Other factors allowing this approach to work are the fact that it is implemented in the Phase 2 portion of the algorithm where most demands may already have been routed and only a small fraction of the total number of demands are requesting others to find alternate routes to free up capacity on routes with contention. A second possible approach allows parallel searches only among demands that do not interfere with one another, and creates a sequence of Phase 2 searches so that within a search group, there is no possibility of a deadlock.

Figure 17A:
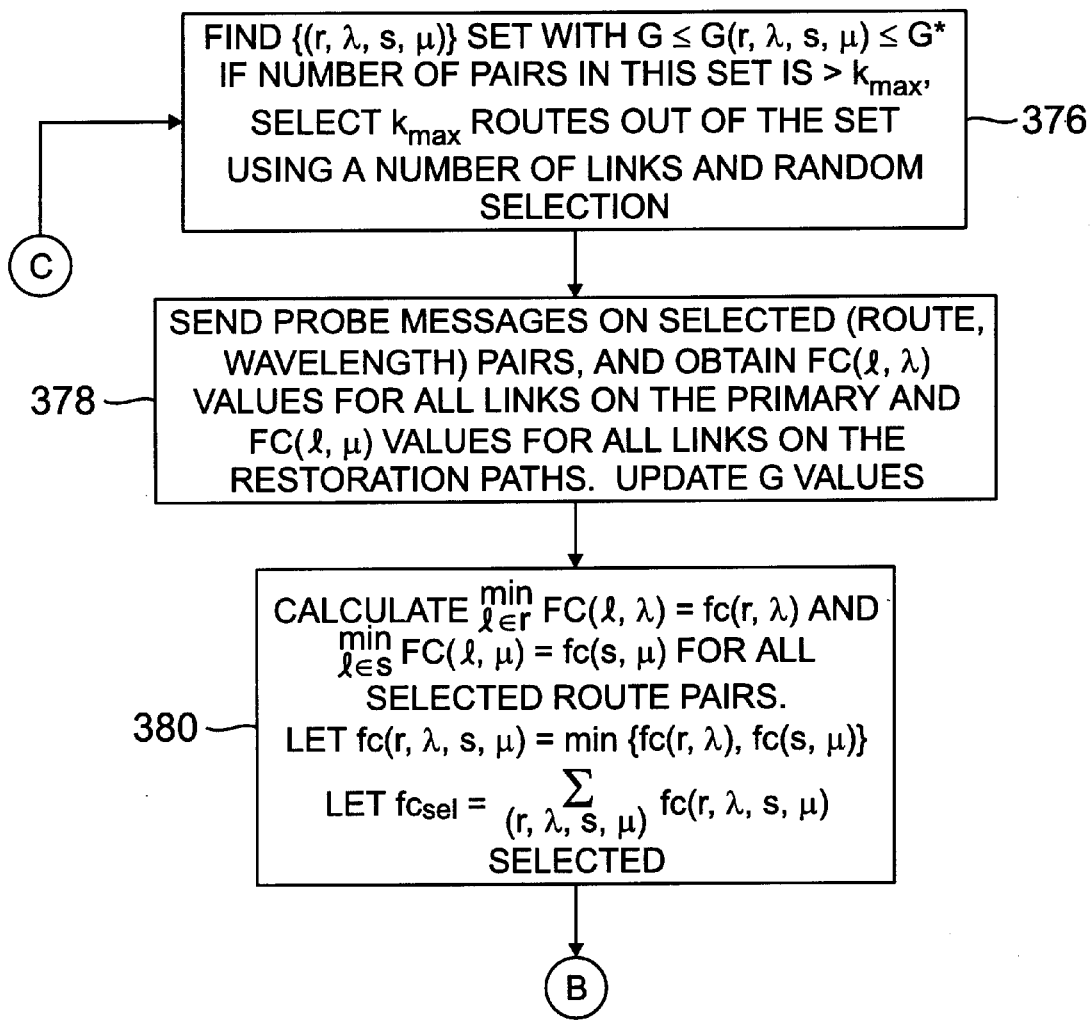
FIGS. 17A and 17B illustrate operations performed asynchronously by source-destination node pairs in a search for primary and restoration paths in accordance with the invention, in a case in which sharing of restoration capacity is permitted.
Figure 17B:
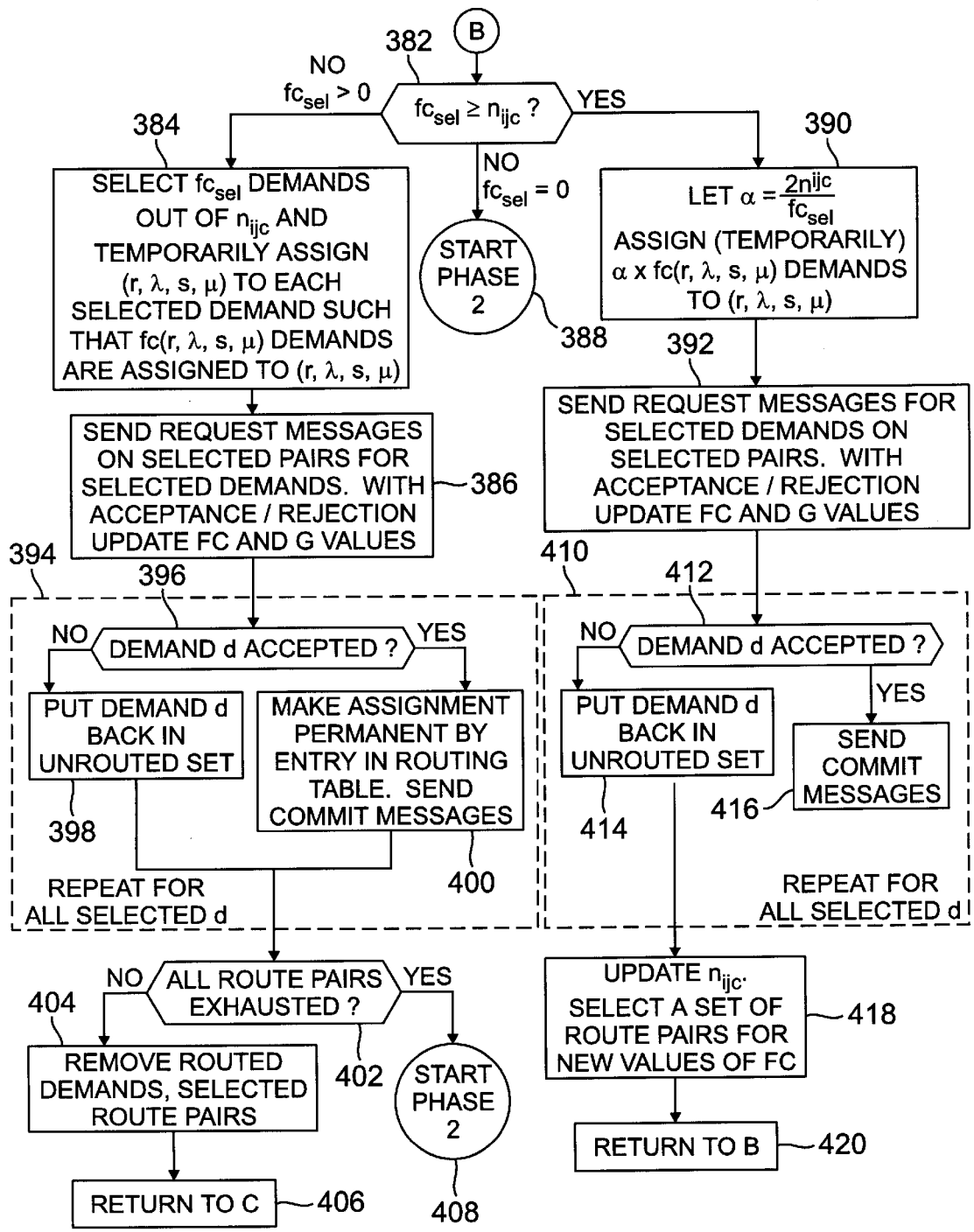

FIGS. 17A and 17B illustrate a Phase 1 portion of an algorithm in which sharing of restoration capacity between demands is permitted. Like the other algorithms described previously, the algorithm illustrated in conjunction with FIGS. 17A and 17B below may be separated into a first phase, referred to as Phase 1 and involving contention-free path determination, and a second phase, referred to as Phase 2 and involving contention resolution and optimization operations. The other algorithms described above generally do not allow two or more demands to share restoration capacity even when no specific failure can cause these demands to need restoration simultaneously. Here, the above algorithms are extended to allow restoration capacity sharing while retaining the advantage of simplicity. The basic principle is as follows. The source node of a demand sends, at some time in the route computation process, an informa-tion message along the restoration route selected for that demand. This message contains the primary route information for that demand. Every link on the restoration path retrieves and stores this information in association with the specific demand. Given this information for all demands using a specific link in their restoration route, the link can easily determine the minimum capacity needed to support the restoration needs of these demands, while allowing for capacity sharing. That is, the links determine which demands using the specific link for a restoration route have primary paths with disjoint failure sets, and allow capacity sharing in their calculation of required capacity. In many cases, the required capacity will be smaller than the sum of demands using that link for a restoration route. This difference represents the advantage provided by sharing, and can be used to support more primary and/or restoration routes.

In order to keep the restoration capacity sharing procedure simple, the information message sent on the primary path can be sent after the restoration route is selected. A disadvantage of such an approach is that the capacity sharing cannot be exploited to allow the use of the link if the link would otherwise have to deny the request. However, the advantage is that the capacity sharing calculations may be performed "off-line." Again, performance analysis of actual network configurations may be used to determine whether it will be more advantageous in a given application to send the information message with every attempt at getting a restoration route, rather than after getting a restoration route from available capacities without taking into capacity sharing by a new demand into account. It should be noted that the algorithm of FIGS. 16A. and 16B may also be implemented with the above-noted primary path information message sent to links in the restoration path. In such an embodiment, the information message would generally be sent after completion of Phase 1 but before the start of Phase 2.

The Phase 1 portion of the algorithm illustrated in conjunction with FIGS. 17A and 17B is capable of handling multiple demands simultaneously, with sharing of restoration capacity. It will be assumed that all demands need primary and restoration routes. It will also be assumed that G values are given for route pairs, that is, the above-defined $G(r, \lambda, s, \mu)$ indices are used. Initial values of $G(r, \lambda, s, \mu)$ may be provided for all disjoint (route, wavelength) pairs between nodes i and j, and for all i and j. The initial G values may be available from prior route usage or may be downloaded from a central controller. The algorithm could also be initiated with no specific initial knowledge of G values. Again, $n_{ij}$ will denote the number of demands between i and j, and $n_{ijc}$ will denote the number of currently unrouted demands between nodes i and j. G* will be used to denote the maximum $G(r, \lambda, s, \mu)$ value over all available $(r, \lambda, s, \mu)$. $G_d$ is a parameter, and G is equal to G* minus $G_d$. The variable $k_{max}(n_{ij})$ will denote the maximum number of route pairs to be tried at a given time.

As noted above, the portion of the algorithm illustrated in FIGS. 17A and 17B corresponds generally to the Phase 1 portion of the algorithm. Step 376 of FIG. 17A determines a set $\{(r, \lambda, s, \mu)\}$ of routes for which $G \leq G(r, \lambda, s, \mu) \leq G^*$. If the number of route pairs in this set is greater than $k_{max}$, then $k_{max}$ route pairs out of the set are selected, based on number of links and random selection. In step 378, PROBE messages are sent on all of the route pairs selected in step 376. The free capacity values FC(l, $\lambda$) are then obtained for all of the links on the selected primary routes and the free capacity values FC(l, $\mu$) are obtained for all of the links on the selected restoration routes. In step 380, the minimum value fc(r, $\lambda$) of the FC(l, $\lambda$) values for all links on each of the selected primary routes is determined. The minimum value fc(s, $\mu$) of the FC(l, $\mu$) values for all links on each of the selected restoration routes is also determined. The minimum of {fc(r, $\lambda$), fc(s, $\mu$)} is designated fc(r, $\lambda$, s, $\mu$), and fc$_{sel}$ is defined as the sum of the fc(r, $\lambda$, s, $\mu$) values over all of the selected route pairs (r, $\lambda$, s, $\mu$). The process continues with the flow diagram of FIG. 17B.

Step 382 of FIG. 17B determines whether fc$_{sel}$ is greater than or equal to the above-described n$_{ijc}$ value. If fc$_{sel}$ is not greater than or equal to n$_{ijc}$, and fc$_{sel}$ is greater than zero, step 384 selects fc$_{sel}$ demands out of the n$_{ijc}$ demands, and temporarily assigns route pairs (r, $\lambda$, s, $\mu$) to each of the selected demands such that fc(r, $\lambda$, s, $\mu$) demands are assigned to route pairs (r, $\lambda$, s, $\mu$). REQUEST messages are then sent in step 386 on the route pairs assigned to the demands selected in step 384. Upon acceptance or rejection of the REQUEST messages, the FC and G values are updated. If fc$_{sel}$ is equal to zero, step 388 indicates that Phase 2 of the algorithm then begins. As noted previously, Phase 2 of the algorithm corresponds generally to a contention resolution phase similar to that described in conjunction with FIG. 13B above. If fc$_{sel}$ is greater than or equal to n$_{ijc}$ step 390 indicates that a value $\alpha$ is defined as 2n$_{ijc}$/fc$_{sel}$, and $\alpha$ times fc(r, $\lambda$, s, $\mu$) demands are assigned temporarily to route pairs (r, $\lambda$, s, $\mu$). REQUEST messages are then sent in step 392 on the route pairs assigned to the demands selected in step 390. Upon acceptance or rejection of the REQUEST messages, the FC and G values are updated.

The set of steps designated 394 is repeated for each of the demands d selected in step 384. In step 396, a determination is made as to whether a particular demand d was accepted. If the demand d was not accepted, it is put back into the set of n$_{ijc}$ unrouted demands, as shown in step 398. If the demand d was accepted, its temporary route pair assignment in step 384 is made permanent by an appropriate routing table entry. COMMIT messages are then sent along the designated route pair for demand d (step 400). After the set of steps 394 is completed, step 402 determines whether or not all route pairs have been exhausted. If all route pairs have not been exhausted, step 404 indicates that the routed demands and their corresponding route pairs are removed from consideration, and the process returns to step 376 of FIG. 17A to process another set of unrouted demands (step 406). If all route pairs have been exhausted, the Phase 2 contention resolution portion of the algorithm is started, as indicated by step 408. As previously noted, the Phase 2 portion of this algorithm may proceed in a manner similar to that described in conjunction with FIG. 13B above.

Similarly, the set of steps designated 410 is repeated for each of the demands d assigned a temporary route pair in step 390. In step 412, a determination is made as to whether a particular demand d was accepted. If the demand d was not accepted, it is put back into the set of n$_{ijc}$ unrouted demands, as shown in step 414. If the demand d was accepted, its temporary route pair assignment in step 390 is made permanent by an appropriate routing table entry, and COMMIT messages are sent along the designated route pair for demand d as shown in step 416. After all of the unaccepted demand d have been placed back in the unrouted set in step 414, the value of n$_{ijc}$ is updated, and a set of route pairs is selected to provide new FC values, as shown in step 418. Step 420 indicates that the process then returns to step 382 of FIG. 17B to attempt to find route pairs for remaining unrouted demands.

6. Hybrid Centralized/Distributed Precomputation

Embodiments of the invention which utilize a hybrid of centralized and distributed techniques will now be described. Generally, primary and restoration route selection using global information and centralized algorithms result in smaller capacity requirements compared to algorithms relying only on distributed computation using only local information. However, the centralized approaches may lead to scalability problems for very large networks. Moreover, centralized approaches typically create a need for frequent state updates to the central controller. Besides becoming a computation bottleneck, the central controller may also become a communication and reliability bottleneck. In some situations, the difference in capacity requirements between centralized and distributed algorithms will not be large. For other situations, particularly those involving highly constrained networks, the capacity difference could be excessive.

In order to further improve the capacity requirement metrics, or alternatively the restorability fraction for a given capacity, of the distributed algorithms described above, local information can be supplemented by collection of additional information through distributed communication using 'state exchange' protocols. Many of the algorithms described herein can be configured to use such state exchanges periodically and follow them with distributed precomputation of restoration routes. With this procedure, both state information exchange and route precomputation are distributed. The state exchanges in limited form allow the algorithms to use some global information in order to make them more efficient from a capacity perspective. The state information exchange may be limited to that needed for the specific algorithm being used, in order to prevent the scalability and bottleneck problems typically associated with fully centralized approaches. In many of the algorithms described herein, correlation among state information for different parts of the network can add significantly to the efficiency of the algorithms in terms of minimizing the capacity requirements. Moreover, the efficacy of the distributed algorithms described herein generally depends on the order of execution by different network elements, and the manner in which deadlocks are broken at various steps. Additional information can therefore be collected in a distributed fashion to generate correlation information. Also, additional information exchanges between algorithm steps can be used to order the steps and to break deadlocks more effectively. However, distributed implementation of these exchanges can result in large communication overhead and delay in reaching convergence in algorithms.

These problems are addressed by an illustrative hybrid centralized/distributed embodiment of the invention which mixes centralized information collection and computation, distributed information exchange and precomputation, and real time execution of precomputed routes. The centralized information collection and computation is less frequent than the distributed information exchange and precomputation, but is selected carefully to provide information that is less likely to change frequently and that is critical for the efficacy of the algorithms implemented in a distributed fashion. The type of information generated and downloaded from a central controller to the controllers in network elements may include:

(1) Connectivity information, such as who is connected to whom in absence of failure.

(2) Total link capacities.

(3) A subset of all possible routes between a source and a destination in the network with an order suggesting the search order. The search order can be modified during route precomputation. The order may be specified individually for each wavelength for optical networks which do not permit wavelength interchange. The subset may be selected by eliminating obviously bad routes from the results of centralized computation.

(4) A link contention index for every link. This index reflects the number of routes out of the above set that contains this link. Instead of a straight count, a weighted count may be given with weights depending on the order of the particular route in the set of routes for a source-destination pair.

(5) Indices given to nodes, links, and/or routes so the indices can be used in deciding the order in which distributed algorithmic actions involving nodes, links, and/or routes should be executed to maximize the efficacy of the algorithms.

It should be noted that only a subset of information from each of the above items need be downloaded from the central controller to a given node, that subset being the one relevant to that particular node. The details as to how the information downloaded from a central controller is used during distributed precomputation of routes will depend on the specific steps of the individual distributed algorithms. In many optical networks, the restoration routes may be allowed to change but primary routes are typically more constrained in terms of the frequency with which changes can be made. With the large variation in demands due to provisioning and reprovisioning in the corresponding service network, provisioning and reprovisioning of primary and restoration routes in the optical network will generally occur randomly, such as from many times a day to once every few days. Since restoration routes are usually allowed to change more frequently, distributed algorithms may be invoked periodically or when demand changes occur in order to optimize primary and restoration routes for new demands and restoration routes for existing demands. However, given the incremental nature of the changes, many of the existing routes will still be the most appropriate ones. These existing routes can therefore be used to drive the initial ordering of routes in distributed algorithms. Some of these existing routes may fail in the route testing portions of the algorithms because of the changes in demands. It is at this stage that the description given above for each algorithm can take over and achieve the best selection in a distributed fashion.

Less frequently, the entire network may need to be examined in order to recalculate primary and restoration routes for all demands. Such a process may be implemented using completely centralized computation, since it will be relatively infrequent and therefore many of the concerns with centralized computation noted above are of less concern, or through distributed computation. If done centrally, the selected routes can be downloaded and then given to the distributed algorithms until the next complete network overhaul. Alternatively, the central computation may be used only to provide ordering of routes, with the ordering given to a distributed algorithm as a starting point for route computation. In any case, the distributed algorithms then take over using the given information as a starting point. The foregoing statements regarding use of limited types of centralized computation in conjunction with distributed precomputation are applicable to all of the illustrative distributed precomputation algorithms described herein.

The above-described embodiments of the invention are intended to be illustrative only. Numerous alternative embodiments may be devised by those skilled in the art without departing from the scope of the following claims.

What is claimed is:

1. A method of determining signal paths for capacity demands in a communication network which includes a plurality of nodes and a plurality of links, each of the links interconnecting a pair of nodes, the method comprising the steps of:

determining at least one signal path in the communication network using a distributed precomputation process implemented by at least a subset of the plurality of nodes; and wherein the distributed precomputation process implemented by the nodes includes a first phase in which paths are allocated for capacity demands to the extent possible without resolving contentions, and a second phase in which contentions between demands for the same capacity are resolved, and wherein determination of a path does not depend on a particular failure in the network due to a use of one or more disjoint paths.

2. The method of claim 1 wherein the first phase of the distributed precomputation process includes a contention locking mechanism which locks a primary path of a given capacity demand to prevent other demands from contending for the same capacity.

3. The method of claim 1 wherein a primary path for the particular demand is removed from consideration in a restoration path search for that demand, such that the primary and restoration paths for that demand are failure disjoint.

4. The method of claim 1 wherein the first phase of the distributed precomputation process provides link capacity control, wherein the link capacity control involves storing a link status table at one or more nodes controlling a given one of the links, the link status table listing a number of specific failures and demands which are affected by the failures.

5. The method of claim 1 wherein the second phase of the distributed precomputation process reroutes paths previously allocated to one or more demands in order to free up capacity required for another demand.

6. The method of claim 1 wherein the first phase includes the steps of:

selecting a demand for which a restoration path is to be computed;

sending a locking message along a primary path of the selected demand in order to lock the primary path;

if the locking of the primary path is not successful, waiting for a period of time and then re-sending the locking message; and if the locking of the primary path is successful, initiating a restoration path search for the demand with the primary path of the demand removed from consideration.

7. The method of claim 6 wherein the first phase includes the steps of:

if a restoration path is found for the demand, releasing the lock on the primary path of the demand and storing the restoration path for the demand; and if a restoration path is not found for the demand, releasing the lock on the primary path of the demand and waiting for the second phase.

8. The method of claim 1 wherein the second phase includes the steps of:

selecting a first demand for which a restoration path is to be computed;

identifying a second demand with which to negotiate;

locking the primary paths of the first and second demands;

releasing the capacity associated with the second demand, and initiating a restoration path search for the first demand with the primary path of the demand removed from consideration; and if a restoration path is not found for the first demand, releasing the lock on the primary path of the second demand and selecting another demand for negotiation.

9. The method of claim 8 wherein the second phase includes the steps of:

if a restoration path is found for the first demand, initiating a restoration path search for the second demand;

if a restoration path is found for the second demand, releasing the locks on the primary paths of the first and second demands, and storing the restoration paths for the first and second demands; and if a restoration path is not found for the second demand, determining a restoration path for the first demand, using a search in which high costs are assigned to links in a cut set identified in a failed path search for the second demand, and initiating a path search for the second demand.

10. The method of claim 9 wherein the second phase includes the steps of:

if a restoration path is found for the second demand, releasing the locks on the primary paths of the first and second demands, and storing the restoration paths for the first and second demands; and if a restoration path is not found for the second demand, releasing the lock on the primary path of the second demand and selecting another demand for negotiation.

11. The method of claim 1 wherein the distributed precomputation process computes primary and restoration paths at the same wavelength for each of a plurality of demands, with no sharing of restoration capacity between the demands.

12. The method of claim 1 wherein the distributed precomputation process computes primary and restoration paths at the same wavelength for each of a plurality of demands, with sharing of restoration capacity permitted between different demands which are not both affected by any single failure.

13. An apparatus for use in determining signal paths for capacity demands in a communication network which includes a plurality of nodes and a plurality of links, each of the links interconnecting a pair of nodes, the apparatus comprising:

a nodal processor associated with a corresponding one of the plurality of nodes in the network, the nodal processor implementing at least a portion of a distributed precomputation process for determining at least one signal path in the communication network, wherein the distributed precomputation process implemented by the nodal processor includes a first phase in which paths are allocated for capacity demands to the extent possible without resolving contentions, and a second phase in which contentions between demands for the same capacity are resolved, and wherein determination of a path does not depend on a particular failure in the network due to a use of one or more disjoint paths.

14. The apparatus of claim 13 wherein the first phase of the distributed precomputation process includes a contention locking mechanism which locks a primary path of a given capacity demand to prevent other demands from contending for the same capacity.

15. The apparatus of claim 13 wherein a primary path for the particular demand is removed from consideration in a restoration path search for that demand, such that the primary and restoration paths for that demand are failure disjoint.

16. The apparatus of claim 13 wherein the first phase of the distributed precomputation process provides link capacity control, wherein the link capacity control involves storing a link status table at one or more nodes controlling a given one of the links, the link status table listing a number of specific failures and demands which are affected by the failures.

17. The apparatus of claim 13 wherein the second phase of the distributed precomputation process reroutes paths previously allocated to one or more demands in order to free up capacity required for another demand.

* * * * *